United States Patent
Zhang et al.

(10) Patent No.: US 12,434,591 B2
(45) Date of Patent: Oct. 7, 2025

(54) ENERGY MANAGEMENT DEVICE

(71) Applicant: Honda Motor Co., Ltd., Tokyo (JP)

(72) Inventors: Junlei Zhang, Long Beach, CA (US); Robert M Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 564 days.

(21) Appl. No.: 18/073,268

(22) Filed: Dec. 1, 2022

(65) Prior Publication Data

US 2024/0181917 A1   Jun. 6, 2024

(51) Int. Cl.
| | |
|---|---|
| *B60L 53/66* | (2019.01) |
| *B60L 53/30* | (2019.01) |
| *B60L 53/64* | (2019.01) |
| *G06Q 50/06* | (2012.01) |

(52) U.S. Cl.
CPC .......... *B60L 53/665* (2019.02); *B60L 53/305* (2019.02); *B60L 53/64* (2019.02); *G06Q 50/06* (2013.01)

(58) Field of Classification Search
CPC .................................................. B60L 53/665
USPC ........................................................ 320/109
See application file for complete search history.

(56) References Cited

U.S. PATENT DOCUMENTS

| | | | |
|---|---|---|---|
| 9,533,594 B2 | 1/2017 | Nakasone et al. | |
| 11,379,917 B2 | 7/2022 | Uyeki | |
| 2010/0235008 A1 | 9/2010 | Forbes et al. | |
| 2012/0116955 A1 | 5/2012 | Prosser et al. | |
| 2013/0184876 A1* | 7/2013 | Roshen ................. | G06F 1/3231 700/277 |
| 2014/0222698 A1 | 8/2014 | Potdar et al. | |
| 2016/0063456 A1 | 3/2016 | Droege | |
| 2018/0154791 A1* | 6/2018 | Homma ................. | B60L 55/00 |
| 2020/0006969 A1* | 1/2020 | Penilla .................... | H04L 67/04 |
| 2020/0334751 A1 | 10/2020 | Lagge et al. | |
| 2021/0203177 A1* | 7/2021 | Peng ....................... | B60L 53/63 |
| 2022/0048399 A1 | 2/2022 | Nishita et al. | |

FOREIGN PATENT DOCUMENTS

| | | |
|---|---|---|
| JP | 2020065395 A | 4/2020 |
| JP | 2020181394 A | 11/2020 |

* cited by examiner

*Primary Examiner* — Yalkew Fantu
(74) *Attorney, Agent, or Firm* — Joshua Freier; American Honda Motor Co., Inc.

(57) ABSTRACT

An electronic device and method for management of energy is disclosed. The electronic device receives charging information associated with a first charging source and a second charging source. The charging information indicates a charging cost and a carbon footprint of the first charging source and the second charging source. The electronic device determines a change in the charging cost and the carbon footprint between the first charging source and the second charging source, and generates visual insights based on the determined change in the charging cost and the corresponding carbon footprint over a predefined time period. The visual insights indicate a cost-saving amount of the charging cost and a carbon-saving amount of the corresponding carbon footprint, for at least one of: the first charging source and the second charging source. The electronic device outputs a notification based on the generated visual insights, the charging cost, and the corresponding carbon footprint.

20 Claims, 13 Drawing Sheets

ENERGY MANAGEMENT DEVICE

BACKGROUND

Advancements in energy management have led to development of various solutions that facilitates reduced carbon footprint (such as, reduced emission of carbon dioxide, and other greenhouse gases in an environment). One of such advancements is a usage of electric power as a fuel in vehicles (such as, electric vehicles), which produces a minimal amount of carbon footprint as compared to vehicles running on fossil fuels (such as petrol, diesel etc.). The electric power of such electric vehicles is typically recharged in an operation environment (such as a household environment) of a user.

In certain cases, the vehicles may be recharged based on a non-renewable energy source (such as an oil-based energy, a natural gas-based energy, a coal-based energy, or a nuclear energy) in the operation environment of the user. Such utilization of non-renewable energy sources may lead to emission of carbon dioxide and other greenhouse gases in the operation environment, which may create pollution and impact the operation environment of the user. Therefore, there may be a need for a system that may control the carbon emission while recharging the vehicles.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for energy management of charging sources to optimize energy usage is disclosed. The electronic device may include circuitry. The circuitry may be configured to receive charging information associated with a first charging source and a second charging source. The charging information may indicate a charging cost and a carbon footprint related to each of the first charging source and the second charging source. The circuitry may determine, over a predefined time period, a change in the charging cost and the corresponding carbon footprint between the first charging source and the second charging source. The circuitry may generate visual insights based on the determined change in the charging cost and the corresponding carbon footprint. The visual insights may indicate a cost-saving amount of the charging cost and a carbon-saving amount of the corresponding carbon footprint, for at least one of: the first charging source and the second charging source. The circuitry may output a notification based on the generated visual insights, the charging cost, and the corresponding carbon footprint.

According to another embodiment of the disclosure, a method for energy management of charging sources to optimize energy usage is disclosed. The method may include receiving charging information associated with a first charging source and a second charging source. The charging information may indicate a charging cost and a carbon footprint related to each of the first charging source and the second charging source. The method may further include determining, over a predefined time period, a change in the charging cost and the corresponding carbon footprint between the first charging source and the second charging source. The method may further include generating visual insights based on the determined change in the charging cost and the corresponding carbon footprint. The visual insights may indicate a cost-saving amount of the charging cost and a carbon-saving amount of the corresponding carbon footprint, for at least one of: the first charging source and the second charging source. The method may further include outputting a notification based on the generated visual insights, the charging cost, and the corresponding carbon footprint.

According to another embodiment of the disclosure, a non-transitory computer-readable medium is provided. The non-transitory computer-readable medium may have stored thereon computer implemented instructions (or computer-executable instructions) that, when executed by a system, causes the system to execute operations. The operations may include receiving charging information associated with a first charging source and a second charging source. The charging information may indicate a charging cost and a carbon footprint related to each of the first charging source and the second charging source. The operations may further include determining, over a predefined time period, a change in the charging cost and the corresponding carbon footprint between the first charging source and the second charging source. The operations further may include generating visual insights based on the determined change in the charging cost and the corresponding carbon footprint. The visual insights may indicate a cost-saving amount of the charging cost and a carbon-saving amount of the corresponding carbon footprint, for at least one of: the first charging source and the second charging source. The operations may further include outputting a notification based on the generated visual insights, the charging cost, and the corresponding carbon footprint.

Figure 1:
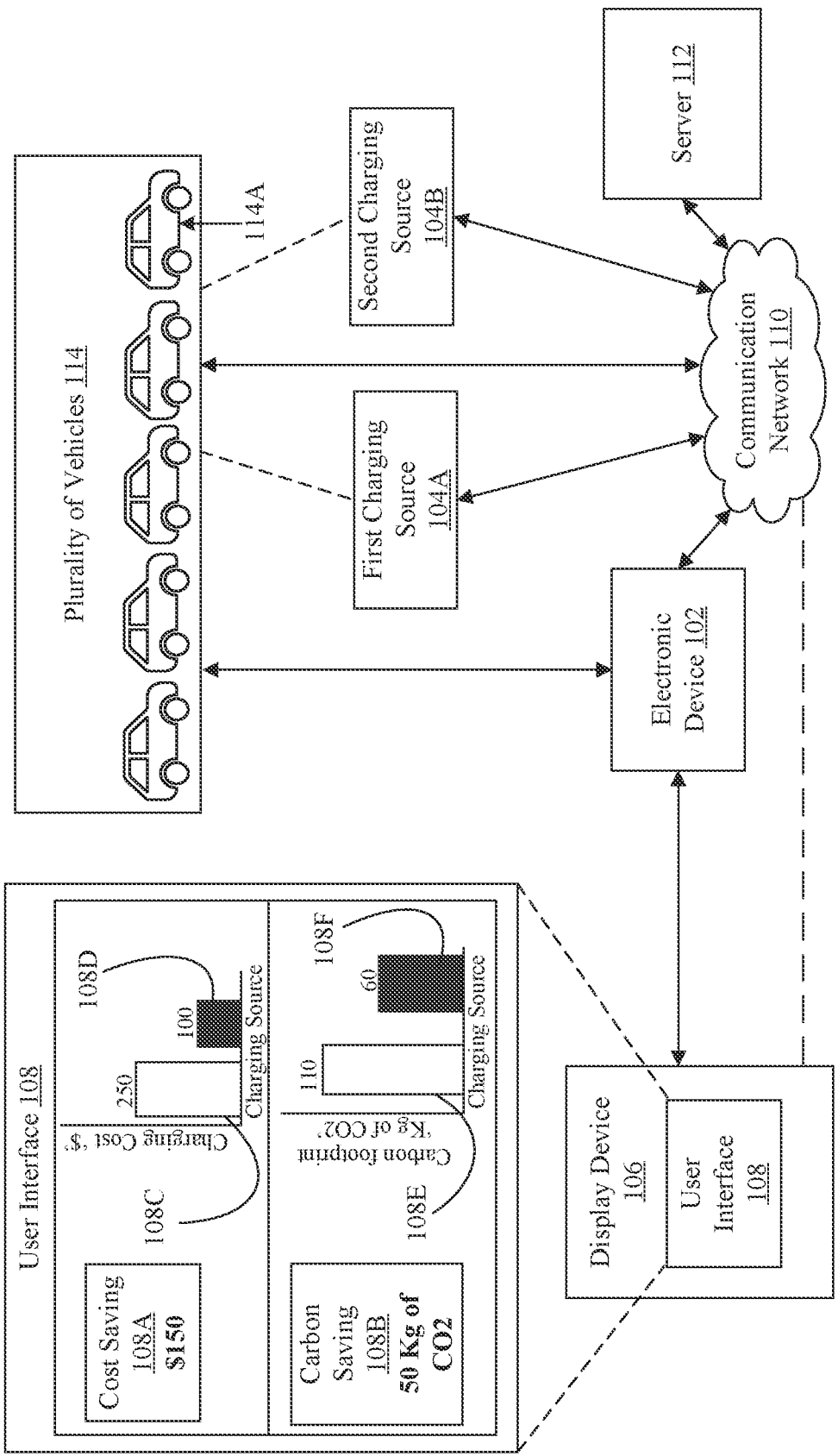
FIG. 1 is a block diagram that illustrates an exemplary network environment for energy management of charging sources, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic device and a method for energy management of charging sources to control carbon emissions while recharging vehicles (such as electric vehicles). The electronic device may be configured to receive charging information associated with a first charging source (for example, a household power socket that may receive the electric power from a non-renewable power source) and a second charging source (for example, an electric vehicle supply equipment (EVSE) that may receive the electric power from a renewable power source). The charging information may indicate a charging cost (for example, a monetary amount spent per unit charging of the vehicle) and a carbon footprint (for example, an amount of emission of carbon dioxide, and other greenhouse gases in an environment) related to each of the first charging source and the second charging source. In some cases, the first charging source may require higher charging cost and emit higher carbon footprint while charging the vehicle, compared to the second charging source.

The electronic device may be configured to determine or monitor a change in the charging cost (for example, a difference in the monetary amount spent per unit charging of the vehicle) and the corresponding carbon footprint (for example, a difference in the amount of emission of carbon dioxide, and other greenhouse gases in the environment) between the first charging source and the second charging source, over a predefined time period (for example, a day, a week, or a month, and the like). Based on the determined change in the charging cost and the corresponding carbon footprint, the electronic device may be configured to generate visual insights (for example, a graphical representation that indicates a comparison of the charging cost and corresponding carbon footprint between the first charging source and the second charging source, as shown in FIG. 1). Based on the generation of the visual insights, the electronic device may be configured to output a notification (such as a visual alert via a display device associated with the electronic device). Based on the output of the notification associated with the change in charging cost, a user of the vehicle may be motivated to select a cost-effective charging source between the first charging source and the second charging source and may save the charging cost based on the selection. Additionally, based on the output of the notification associated with the change in the carbon footprint, the user may be motivated to select an environmental-friendly charging source between the first charging source and the second charging source, and may minimize the carbon emission while recharging the vehicles based on the selection.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for energy management of charging sources, in accordance with an embodiment of the disclosure. With reference to FIG. 1, there is shown a network environment 100. The network environment 100 includes an electronic device 102, a first charging source 104A, a second charging source 104B, a display device 106, a user interface 108, a communication network 110, a server 112, and a plurality of vehicles 114. The electronic device 102 may communicate with the first charging source 104A, the second charging source 104B, and the server 112, through the communication network 110.

The electronic device 102 may include suitable logic, circuitry, interfaces, and/or code that may be configured to receive charging information associated with the first charging source 104A and the second charging source 104B. The charging information may indicate a charging cost and a carbon footprint related to each of the first charging source 104A and the second charging source 104B. Based on the received charging information, the electronic device 102 may determine a change in charging cost and corresponding carbon footprint between the first charging source 104A and the second charging source 104B and generate visual insights of the determined change. The visual insights may indicate a cost-saving amount of the charging cost and a carbon-saving amount of the corresponding carbon footprint for at least one of: the first charging source 104A and the second charging source 104B. The electronic device 102 may output a notification (such as a visual alert) based on the generated visual insights. Examples of the electronic device 102 may include, but are not limited to, a computing device, a desktop, a personal computer, a laptop, a computer workstation, a tablet computing device, a smartphone, a cellular phone, a mobile phone, a consumer electronic (CE) device having a display, a wearable display, or an edge device connected to a user's home network or an organization's network.

The first charging source 104A may include suitable logic, circuitry, and/or interfaces that may be configured to receive electric power from a non-renewable energy source (such as an oil-based energy, a natural gas-based energy, a coal-based energy, or a nuclear energy). Details of such non-renewable energy source is further described, for example, in FIG. 12. In an embodiment, the first charging source 104A may be configured to charge a vehicle (such as a vehicle 114A shown in FIG. 1) based on the received electric power from the non-renewable energy sources. In certain cases, the first charging source 104A may be configured to control, process, and/or monitor consumption of the electric power during charging of the vehicle and determine corresponding charging cost associated with the consumption of the electric power. Details of monitoring of the consumption of the electric power is further described, for example, in FIG. 12. In some other cases, the first charging source 104A may be disposed in a private location (such as a residential or commercial space) or a public location (such as parking areas of shopping malls, hospitals, corporate office, etc.). Examples of the first charging source 104A may include, but are not limited to, a CHAdeMO (CHArge de Move) system coupled to household power socket, and the like. The first charging source 104A shown in FIG. 1 is presented merely as an example. The first charging source 104A may include only one charging source or more than one charging source, for charging the vehicle, without deviation from the scope of the disclosure. For the sake of brevity, only one charging source has been shown in FIG. 1. However, in some embodiments, there may a plurality of first charging sources, without limiting the scope of the disclosure.

The second charging source 104B may include suitable logic, circuitry, and/or interfaces that may be configured to receive electric power from a renewable energy source (such as solar energy, a wind energy, a geothermal energy, or a hydropower based-energy). Details of such renewable energy source is further described, for example, in FIG. 12. In an embodiment, the second charging source 104B may be configured to charge the vehicle based on the received electric power from the non-renewable energy sources. In certain cases, the second charging source 104B may be configured to control, process, and/or monitor consumption of the electric power during charging of the vehicle and determine corresponding charging cost associated with the consumption of the electric power. Details of monitoring of the consumption of the electric power is further described, for example, in FIG. 12. In some other cases, the second charging source 104B may be disposed in a private location (such as a residential or commercial space) or a public location (such as parking areas of shopping malls, hospitals, corporate office, etc.). Examples of the second charging source 104B may include, but are not limited to, an electric vehicle supply equipment (EVSE), an Alternating Current (AC) based-charging station, a Direct Current (DC) based-fast charging station, etc. The second charging source 104B shown in FIG. 1 is presented merely as an example. The second charging source 104B may include only one charging source or more than one charging sources for charging the vehicle, without deviation from the scope of the disclosure. For the sake of brevity, only one charging source has been shown in FIG. 1. However, in some embodiments, there may a plurality of second charging sources, without limiting the scope of the disclosure.

Although in FIG. 1, the first charging source 104A and the second charging source 104B are shown separated from the electronic device 102, the disclosure is not so limited. Accordingly, in some embodiments, the electronic device 102 may be integrated in at least one of the first charging source 104A and the second charging source 104B, without deviation from scope of the disclosure. In such case, the electronic device 102 may facilitate a plurality of vehicles 114 to be charged by the first charging source 104A or the second charging source 104B as described, for example, at FIGS. 3-8 and 10-11. For example, the electronic device 102 may be a management device/server or a control device which may control or manage the first charging source 104A and the second charging source 104B to facilitate charging for the plurality of vehicles 114.

The display device 106 may include suitable logic, circuitry, and interfaces that may be associated with the electronic device 102 and configured to display a user interface 108 (UI 108) that output a notification based on the generated visual insights, the charging cost, and the corresponding carbon footprint. In one example, the display device 106 facilitates a visual notification to the user, so that, the user may be motivated to select between the first charging source 104A and the second charging source 104B, to save the charging cost and also minimize carbon emissions based on the selection. In another example, in addition to the display device 106, there may be a speaker (not shown), which may be configured to provide an audible notification or an audio-visual notification to the user. In yet another example, in addition to the display device 106, there may also be a vibration motor (not shown), which may be configured to provide a vibratory notification to the user. Examples of the display device 106 may include, but not limited to, at least one of a Liquid Crystal Display (LCD) display, a Light Emitting Diode (LED) display, a plasma display, or an Organic LED (OLED) display technology. In some cases, the display device 106 may also be configured to receive input from a user, via the UI 108. In an embodiment, the display device 106 may be integrated in the electronic device 102. In some embodiments, the display device 106 may be communicably coupled to the electronic device 102. In some embodiments, the display device 106 may be integrated in the vehicle charged by one of the first charging source 104A and the second charging source 104B. In such cases, the examples of the display device 106 may include, but not limited to, an in-vehicle infotainment (IVI) system, an in-car entertainment (ICE) system, an automotive Head-up Display (HUD), an automotive dashboard, or a human-machine interface (HMI).

The UI 108 may be used for displaying the output notifications associated with the determined visual insights that may indicate a cost-saving amount of the charging cost and a carbon-saving amount of the corresponding carbon footprint in each of the first charging source 104A and the second charging source 104B. In an example, the graphical representation (as the visual insights) of the UI 108 may indicate a first charging cost 108C (for example, $250) for charging the vehicle at the first charging source 104A and a second charging cost 108D (for example, $100) for charging the vehicle at the second charging source 104B. The electronic device 102 may compare a change in the charging cost (for example, $150) between the first charging source 104A and the second charging source 104B and may recommend the second charging source 104B for the user as the notification, to reduce a cost of charging the vehicle. For example, the UI 108 may represent the visual insights to include a cost-saving amount 108A that may be configured to indicate the change in the charging cost (for example, $150) between the first charging source 104A and the second charging source 104B. It may be noted that the cost-saving amount 108A shown in FIG. 1 is presented merely as an example of a way of visual representation of the amount of cost saved based on the selection of the second charging source 104B.

The present disclosure may be also applicable to other types of visual representation to display the amount of cost saved, such as a graphic image of a pile of coins, a graphic image of a pile of credit notes, and the like. The description of other types of graphical representation has been omitted from the disclosure for the sake of brevity.

In another example, the graphical representation (as the visual insights) of the UI 108 may indicate a first carbon footprint 108E (for example, 110 Kg of Co2) for charging the vehicle at the first charging source 104A and a second carbon footprint 108F (for example, 60 Kg of Co2) for charging the vehicle at the second charging source 104B. The electronic device 102 may compare a change in the carbon footprint (for example, 50 Kg of Co2) between the first charging source 104A and the second charging source 104B and may recommend the second charging source 104B for the user as the notification, to minimize carbon emissions in the network environment 100. For example, the UI 108 may represent the visual insights to include a carbon-saving amount 108B that may be configured to indicate the change in the carbon footprint (for example, 50 Kg of Co2) between the first charging source 104A and the second charging source 104B. It may be noted that the carbon-saving amount 108B shown in FIG. 1 is presented merely as an example of a way of visual representation of the amount of carbon saved based on the selection of the second charging source 104B. The present disclosure may be also applicable to other types of visual representation to display the amount of cost saved, such as a graphic image of a pile of plants/trees, a graphic image of leaves in green color, and the like. The description of other types of graphical representation has been omitted from the disclosure for the sake of brevity.

The communication network 110 may include a communication medium through which the electronic device 102, the first charging source 104A, the second charging source 104B, and the server 112 may communicate with each other. The communication network 110 may include on of a wired connection or a wireless connection. Examples of the communication network 110 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The server 112 may include suitable logic, circuitry, interfaces, and/or code that may be configured to store charging information associated with the first charging source 104A and the second charging source 104B. In an embodiment, the server 112 may transmit the charging information associated with the first charging source 104A and the second charging source 104B to the electronic device 102. The server 112 may execute operations through web applications, cloud applications, HTTP requests, repository operations, file transfer, and the like. Example implementations of the server 112 may include, but are not limited to, a database server, a file server, a web server, an application server, a mainframe server, a cloud computing server, or a combination thereof. In an embodiment, the server 112 may be implemented as a plurality of distributed cloud-based resources by use of several technologies that are well known to those ordinarily skilled in the art. A person with ordinary skill in the art will understand that the scope of the disclosure may not be limited to the implementation of the server 112 and the electronic device 102 as two separate entities. In certain embodiments, the functionalities of the server 112 can be incorporated in its entirety or at least partially in the electronic device 102, without a departure from the scope of the disclosure.

The plurality of vehicles 114 may include a non-autonomous vehicle, a semi-autonomous vehicle, or a fully autonomous vehicle, for example, as defined by National Highway Traffic Safety Administration (NHTSA). Examples of the vehicle may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. In an example, the plurality of vehicles 114 may include the vehicle 114A that uses renewable power sources or non-renewable power sources, such as, an electric propulsion-based energy source, a hydrogen fuel-based energy source, a solar-powered energy source, or a hybrid energy source (which is a combination of alternative energy sources). In an embodiment, the plurality of vehicles 114 may include a two-wheeler vehicle or a four-wheeler vehicle. Examples of the two-wheeler vehicle may include, but are not limited to, an electric two-wheeler or a hybrid two-wheeler. Similarly, examples of the four-wheeler vehicle may include, but are not limited to, an electric car or a hybrid car. It may be noted here that the four-wheeler vehicles are merely shown as examples in FIG. 1. The present disclosure may be also applicable to other types of two-wheelers (e.g., a scooter) or four-wheelers. The description of other types of the vehicle has been omitted from the disclosure for the sake of brevity.

During operation, the electronic device 102 may receive charging information (such as the charging cost and the corresponding carbon footprint) associated with each of the first charging source 104A and the second charging source 104B. The electronic device 102 may receive the charging information from a computing or communication device (not shown) associated with each of the first charging source 104A and the second charging source 104B. The first charging source 104A and the second charging source 104B may be utilized by a user associated with the electronic device 102 to charge the vehicle (such as the vehicle 114A). The user may be an owner of the electronic device 102 and may be an owner or a passenger of the vehicle that may be charged by either or both of the first charging source 104A and the second charging source 104B at regular basis (like hourly, daily, or weekly). The charging information may indicate a charging cost (such as, a cost for charging the vehicle, for example, in '$') and/or a carbon footprint (such as, an amount of carbon emitted for charging the vehicle, for example, in 'Kg of CO2') related to each of the first charging source 104A and the second charging source 104B. The electronic device 102 may further determine or monitor the change in the charging cost (as shown in the cost-saving amount 108A) and the corresponding carbon footprint (as shown in the carbon-saving amount 108B) between the first charging source 104A and the second charging source 104B, over the predefined time period (for example, a day, a week, or a month, and the like). Based on the determined change in the charging cost and the corresponding carbon footprint over the period of time, the electronic device 102 may be configured to generate visual insights (for example, a graphical representation that indicates a comparison of charging cost (as shown in the cost-saving amount 108A) and corresponding carbon footprint (as shown in the carbon-saving amount 108B) between the first charging source 104A and the second charging source 104B. For example, based on the charging cost determined or tracked over the period of time (say in last 1 week), the electronic device 102 may determine that the cost for charging the vehicle using the second charging source 104B (i.e., that works based on the renewable energy source) is lower (such as $150 cheaper as shown in FIG. 1) than the cost for charging the vehicle using the first charging source 104A (i.e., that works based on the non-renewable energy source). Based on such determination, the electronic device 102 may generate the visual insight (such as including the cost-saving amount 108A and the carbon-saving amount 108B shown in FIG. 1) for the user of the vehicle. Based on the generation of the visual insights, the electronic device 102 may be configured to output a notification (via the UI 108 of the display device 106) for the user.

Based on the output of the notification associated with the change in charging cost (such as via the cost-saving amount 108A in the UI 108), the user of the vehicle may be motivated to select a cost-effective charging source between the first charging source 104A and the second charging source 104B and may save the charging cost based on the selection. Additionally, based on the output of the notification associated with the change in the carbon footprint (as shown in the carbon-saving amount 108B in the UI 108), the user may be motivated to select the environmental-friendly charging source between first charging source 104A and the second charging source 104B, and may minimize the carbon emission while recharging the vehicle based on the selection. In an embodiment, the first charging source 104A and the second charging source 104B, for example, may be located at different places, like the first charging source 104A (i.e., non-renewable energy source) may be located at a residence place or at home of the user of the electronic device 102 (or the vehicle 114A), and the second charging source 104B (i.e., renewable energy source) may be located at a workplace or an office of the user. For example, the office of the user may include additional number of charging sources/stations than a number of charging sources/stations available at the home. As a demand for charging is less at the office due to additional number of charging sources/stations, the charging cost at the office may be cheaper compared to the charging cost of the home of the user. Therefore, based on the notification or the generated visual insights by the disclosed electronic device 102, the user may effectively decide where exactly he/she can charge the vehicle to earn more benefits (i.e., the cost saving or the carbon-saving).

In addition, based on the selection of the second charging source 104B (i.e., renewable energy source) and further based on the charging of the vehicle by the second charging source 104B, the user (or the vehicle of the electronic device 102 associated with the user or the vehicle) by earn or receive renewable energy credits from the second charging source 104B or from a particular renewable energy related authorities. The electronic device 102 may further track or store information about such earned or accumulated renewable energy credits over the period of time. For example, the stored information may include but is not limited to, date-time associated with the charging, location of the second charging source 104B, duration of charging, or an amount of charging. The electronic device 102 may further facilitate the user to implement or utilize the earned energy credit at different places (like at home) where the renewable energy sources may be unavailable, or carbon emission may be higher.

Figure 2:
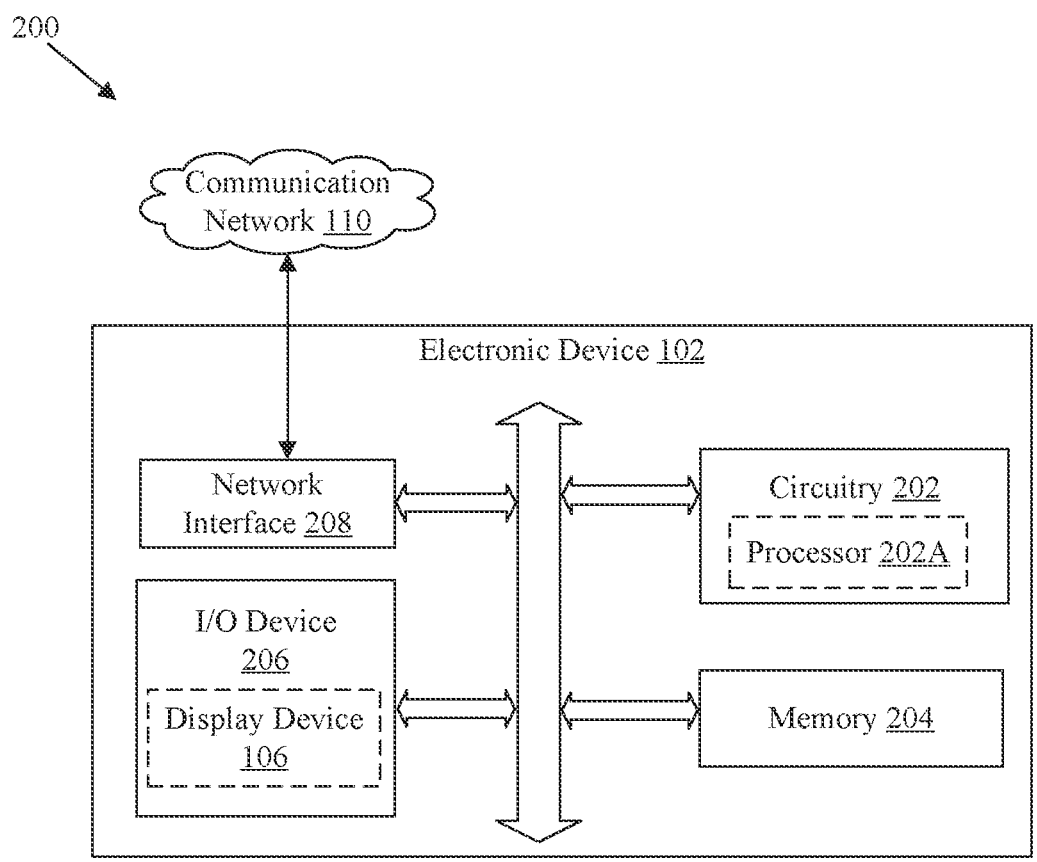
FIG. 2 is a block diagram that illustrates an exemplary electronic device shown in the exemplary network environment of FIG. 1, in accordance with an embodiment of the disclosure.

FIG. 2 is a block diagram that illustrates an exemplary electronic device shown in the exemplary network environment of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, the display device 106, and a network interface 208. In at least one embodiment, the I/O device 206 may also include a display device 106. The circuitry 202 may also include a processor 202A. The circuitry 202 may be communicatively coupled to the memory 204, the I/O device 206, and the network interface 208 through wired or wireless communication of the electronic device 102.

The processor 202A may include suitable logic, circuitry, and/or interfaces code that may be configured to execute program instructions associated with different operations to be executed by the electronic device 102. For example, some of the operations may include: reception of charging information associated with the first charging source 104A and the second charging source 104B, determination of the change in the charging cost and the corresponding carbon footprint between the first charging source 104A and the second charging source 104B, generation of visual insights based on the determined change in the charging cost and the corresponding carbon footprint, output of the notification based on the generated visual insights, the charging cost, and the corresponding carbon footprint.

The processor 202A may include any suitable special-purpose or general-purpose computer, computing entity, or processing device including various computer hardware or software modules and may be configured to execute instructions stored on any applicable computer-readable storage media. For example, the processor 202A may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The processor may include any number of processors configured to, individually or collectively, perform or direct performance of any number of operations of the display device 106, as described in the present disclosure. Examples of the processor may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the program instructions executable by the processor 202A. In at least one embodiment, the memory 204 may be further configured to store ownership information of the vehicle (for example, information associated with a registration of the vehicle to confirm whether the vehicle is owned by an organization or an employee). The memory 204 may be also configured to store information related to identification of the vehicle (for example, information associated with a registration number of the vehicle, engine chassis number etc.). In an embodiment, the memory 204 may store the charging information associated with each of the first charging source 104A and the second charging source 104B. Example implementations of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include one or more input and output devices that may communicate with different components of the network environment 100. For example, the I/O device 206 may receive user inputs, via the display device 106, to trigger execution of program instructions associated with different operations executed by the electronic device 102. Examples of the I/O device 206 may include, but are not limited to, a touch screen, a keyboard, a mouse, a joystick, a microphone, the display device 106, and a speaker.

The network interface 208 may include suitable logic, circuitry, and interfaces that may be configured to facilitate communication between the electronic device 102, the first charging source 104A, the second charging source 104B, the display device 106, and the server 112, via the communication network 110. The network interface 208 may be implemented by use of various known technologies to support wired or wireless communication of the server 112 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

Figure 3:
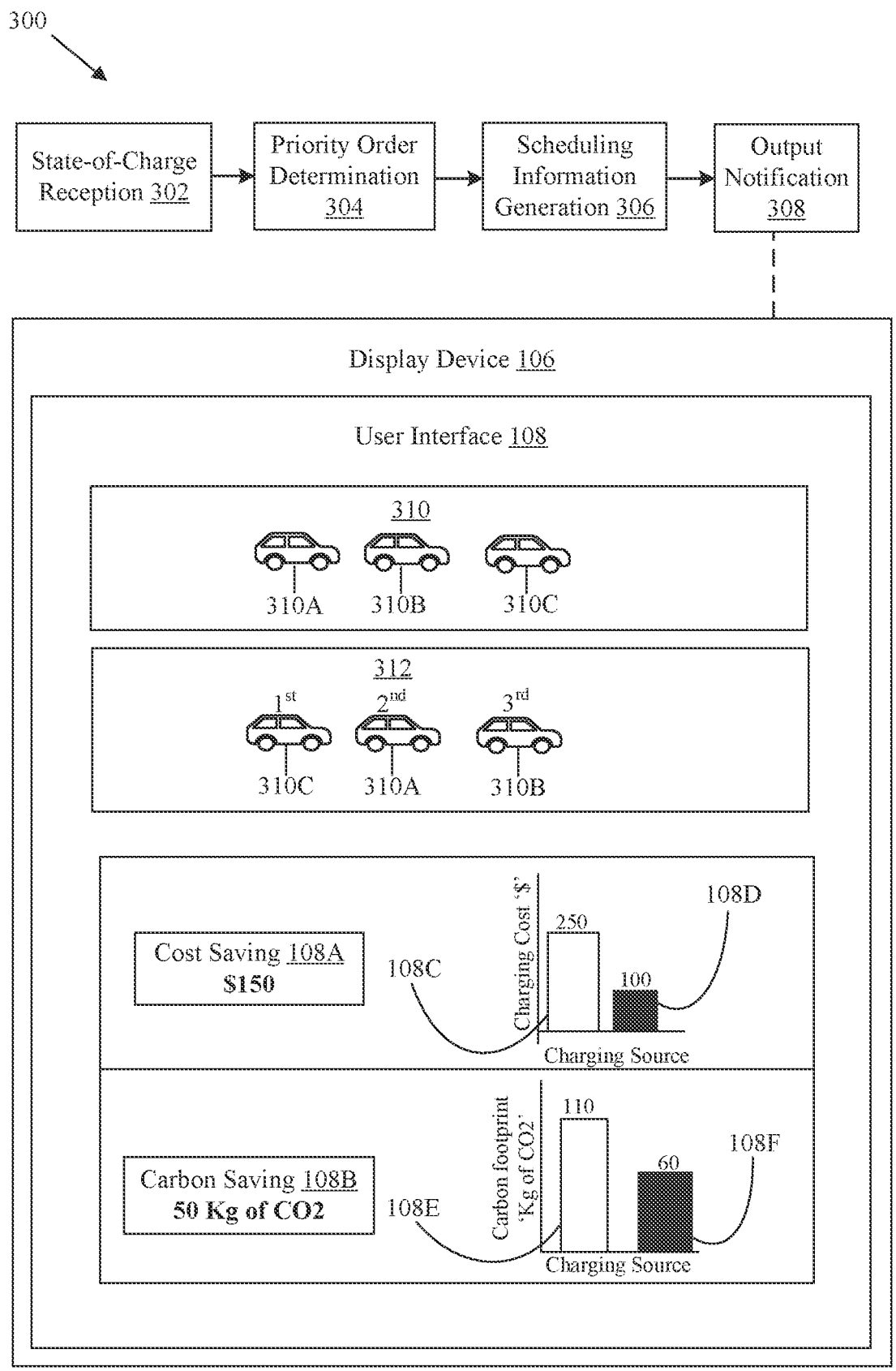
FIG. 3 is a diagram that illustrates an exemplary execution pipeline for prioritizing and scheduling charging event based on state-of-charge (SOC) of vehicles, in accordance with an embodiment of the disclosure.

FIG. 3 is a diagram that illustrates an exemplary execution pipeline for prioritizing and scheduling charging event based on state-of-charge (SOC) of vehicles, in accordance with an embodiment of the disclosure. FIG. 3 is explained in conjunction with elements from FIG. 1 and FIG. 2. With reference to FIG. 3, there is shown an exemplary execution pipeline 300. The execution pipeline may include a set of operations (302 to 308) that may be executed by one or more components of FIG. 1, such as, the electronic device 102 or the circuitry 202 in FIG. 2. The set of operations may be performed by the electronic device 102 for energy management of charging sources (such as the first charging source 104A and the second charging source 104B) to optimize energy usage. The electronic device 102 (performing the set of operations in FIG. 3) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 302, a state-of-charge reception operation may be executed. In the state-of-charge selection operation, the circuitry 202 may be configured to receive a state-of-charge (SOC) from a plurality of vehicles (such as the plurality of vehicles 114 shown in FIG. 1) that may be associated with (or charged by) at least one of: the first charging source 104A and the second charging source 104B. In an embodiment, each vehicle of the plurality of vehicles may be associated with one of: the first charging source 104A, the second charging source 104B, or a combination of the first charging source 104A and the second charging source 104B. The SOC may be received from a communication device (like electronic communication device, electronic control unit, etc) associated with each of the plurality of vehicles. In an example, for a queue of five vehicles, from which the SOC are received, first three vehicles may be associated with the first charging source 104A, and rest two vehicles may be associated with the second charging source 104B. The SOC may be defined as the ratio of the available capacity and the maximum possible charge that can be stored in a battery pack of the vehicle. For example, a fully charged battery pack of the vehicle may have SOC as 1 or 100%, while a fully discharged battery pack of the vehicle may have an SOC of 0 or 0%. Based on the received SOC, the electronic device 102 may facilitate in determining priority order of each of the plurality of the vehicles to be charged by one of the first charging source 104A and the second charging source 104B.

At 304, priority order determination operation may be executed. In the priority order determination process, the circuitry 202 may be configured to determine a priority order for each vehicle of the plurality of vehicles to charge from at least one of: the first charging source 104A and the second charging source 104B, based on the received state-of-charge from the plurality of vehicles. For example, for each vehicle of the plurality of the vehicles, the circuitry 202 may receive the SOC. Based on the reception, the circuitry 202 may compare the SOC of each vehicle with the SOC of other vehicles of the plurality of vehicles to determine the priority of each vehicle to be charged. In an embodiment, based on comparison of SOC for each vehicle of the plurality of vehicles, the vehicle with least amount of SOC may be allocated with a highest priority for charging operation. In an example, in case there are two vehicles (such as, a vehicle A and a vehicle B) in queue for charging at the first charging source 104A. In some cases, the circuitry 202 may determine that the vehicle A has the SOC of 50% (i.e., 50% residual SOC that may be left in the battery pack of the vehicle A) and the vehicle B has the SOC of 20% (i.e., 20% residual SOC that may be left in the battery pack of vehicle A). Therefore, based on the determination of the SOC in each vehicle of the plurality of vehicles, the circuitry 202 may allocate a higher priority order for the vehicle B as compared to the vehicle A. The determined priority order may be used to generate a schedule for charging the plurality of vehicles at a corresponding charging source (any of the first charging source 104A, and the second charging source 104B).

At 306, scheduling information generation operation may be executed. In the schedule information generation operation, the circuitry 202 may be configured to generate scheduling information based on the determined priority order. The scheduling information may indicate an order of charging of each vehicle of the plurality of vehicles. For example, when the vehicles (such as, the vehicle A and the vehicle B) are in queue for charging at the second charging source 104B, the circuitry 202 may set, based on the comparison of SOC, that the vehicle A may be at a higher priority order, and the vehicle B may be set at a minimal priority order and accordingly generate the scheduling information indicating the charging schedule for charging both vehicle A and vehicle B. Therefore, when the charging schedule is generated based on the determined priority order, the vehicle A may be charged in a first order, and then the vehicle B may be charged in a second order. The generated charging schedule may be outputted or displayed in the User Interface 108 of the display device 106.

At 308, output notification operation may be executed. In the output notification operation, the circuitry 202 may be configured to output the notification based on the generated scheduling information. In an embodiment, the visual insights may be generated based on the scheduling information, and such scheduling information may be displayed on the user interface 108 of the display device 106 as the visual insights. For example, as displayed on the user interface 108 in FIG. 3, there may be shown a plurality of vehicles in queue 310 that may indicate a physical location of the plurality of vehicles in queue at the corresponding charging source (for example, at one of: the first charging source 104A, and the second charging source 104B). The plurality of vehicles in the queue 310 may include a first vehicle 310A, a second vehicle 310B, and a third vehicle 310C. In an embodiment, the circuitry 202 may generate a charging schedule 312 for the plurality of vehicles in the queue 310. The charging schedule 312 may indicate the priority order that may be generated based on the received SOC for each vehicle of the plurality of vehicles in the queue 310. The generated charging schedule 312 indicates that the third vehicle 310C is in a first priority order in the charging schedule 312, the first vehicle 310A is in a second priority order in the charging schedule 312, and the second vehicle 310B is in a third priority order in the charging schedule 312. The electronic device 102 may further output (or display) the generated visual insights (as shown in FIG. 3) as the notification to the user of the electronic device 102. In such case, the user may be a person associated with a charging source or station (like the first charging source 104A, and the second charging source 104B) who may be monitoring or controlling the charging order of the plurality of vehicles being charged at that charging source or station. The user may be an owner of the charging source/station or an executive deployed to manage the charging source/station at which the plurality of vehicles are being queued to be charged. Therefore, the disclosed electronic device 102 may automatically determine the charging schedule for each of the plurality of vehicles (based on real-time SOC of each vehicle) and notify the charging schedule or the order of charging to the user.

In an embodiment, the circuitry 202 may further output the notification indicating the visual insights related to the cost-saving amount 108A and the carbon-saving amount 108B (as shown in FIG. 3) determined based on the charging information received from current charging source (where the plurality of vehicles are being charged) and from other charging sources/stations. The details related to the visual insights related to the cost-saving amount 108A and the carbon-saving amount 108B determined based on the charging information are provided, for example, in FIG. 1.

Therefore, based on the notification indicating the visual insights (shown in FIG. 3), provided by the disclosed electronic device 102, the user of the electronic device 102 may suggest other users (i.e., drivers or passengers) of the plurality of vehicles to effectively select one of the charging sources to get different benefits (like cost saving or carbon saving).

Figure 4:
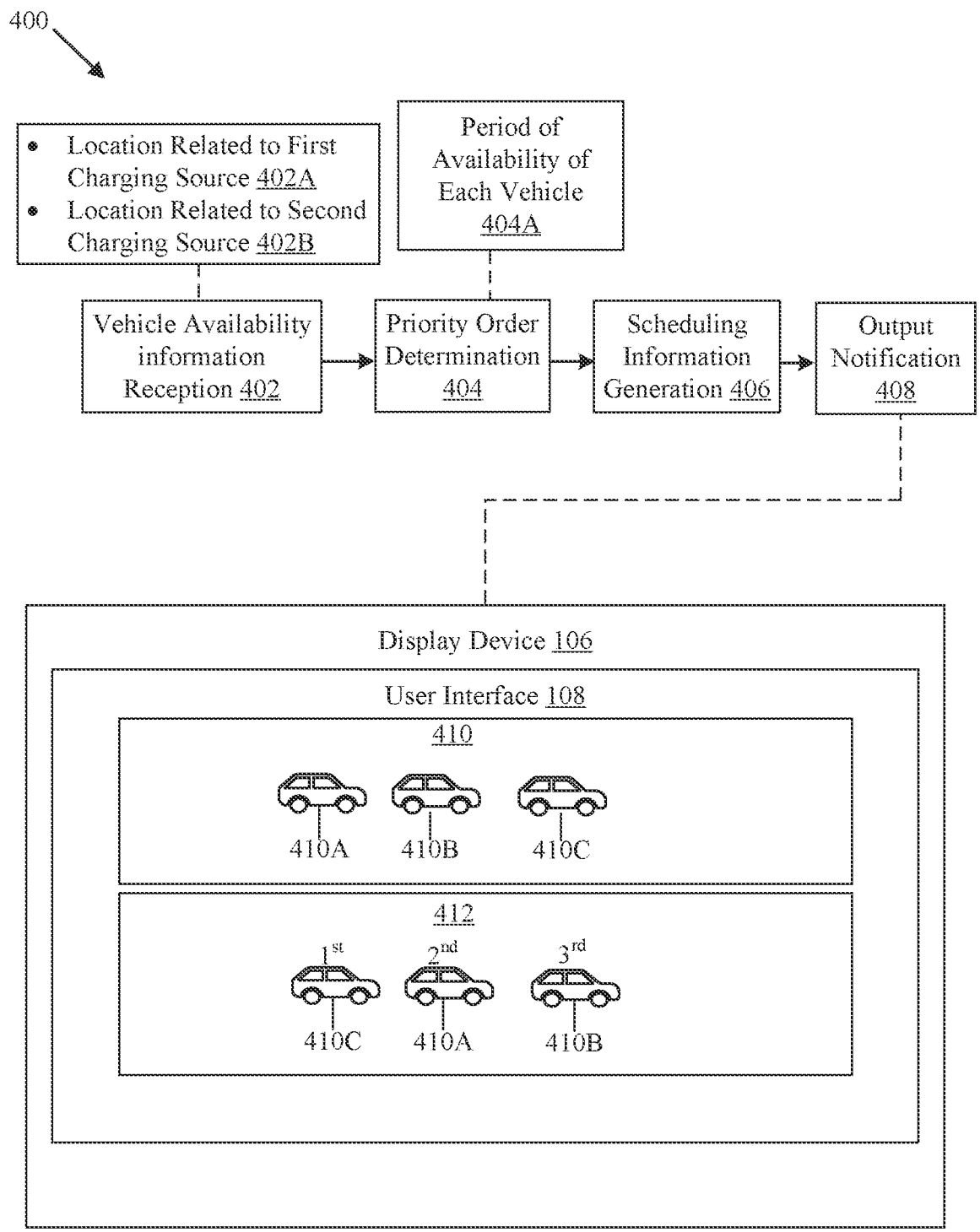
FIG. 4 is a diagram that illustrates an exemplary execution pipeline for prioritizing and scheduling charging event based on availability information of vehicles, in accordance with an embodiment of the disclosure.

FIG. 4 is a diagram that illustrates an exemplary execution pipeline for prioritizing and scheduling charging event based on availability information of vehicles, in accordance with an embodiment of the disclosure. FIG. 4 is explained in conjunction with elements from FIG. 1, FIG. 2, and FIG. 3. With reference to FIG. 4, there is shown an exemplary execution pipeline 400. The execution pipeline may include a set of operations (402 to 408) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 4) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 402, vehicle availability information reception operation may be executed. In an embodiment, the circuitry 202 may be configured to receive availability information of a plurality of vehicles associated with at least one of: the first charging source 104A and the second charging source 104B. The availability information corresponds to a period of availability of each vehicle of the plurality of vehicles at a location related to at least one of: the first charging source 104A and the second charging source 104B. The availability information may be received from a communication device (not shown) associated with each of the plurality of vehicles or associated with a user (driver or passenger) of each of the plurality of vehicles. In certain cases, the vehicle such as the vehicle A and the vehicle B may be present at a location related to the first charging source 402A. In a first scenario, the vehicle A may be available to get charged from 2 pm-4 pm, and the vehicle B may be available to get charged from 10 am-12 pm at the location related to the first charging source 402A. The availability information may relate to events stored in the communication device related to the vehicle A and the vehicle B, where the events may indicate when the corresponding vehicle has to be charged at a location associated with a particular charging source. Therefore, based on receipt of the availability information, the circuitry 202 may be configured to generate a priority order for each vehicle (i.e., the vehicle A and the vehicle B) to be charged. In a second scenario, the circuitry 202 may detect a presence of a vehicle C and a vehicle D at a location related to a second charging source 402B. In some cases, the vehicle C might be available to get charged from 4 pm-6 pm, and vehicle D might be available to get charged from 7 pm-9 pm. Therefore, based on receipt of the availability information, a priority order for each vehicle (i.e., the vehicle C and the vehicle D) may be generated. In an embodiment, the circuitry 202 may determine the priority order of the vehicles based on the vehicle availability information reception operation.

At 404, priority order determination operation may be executed, In the priority order determination operation, the circuitry 202 may be configured to determine a priority order for each vehicle of the plurality of vehicles to be charged from at least one of: the first charging source 104A and the second charging source 104B, based on the received availability information. In an embodiment, the electronic device 102 may use the period of availability of each vehicle 404A to determine the priority order for the plurality of vehicles. For example, the vehicle A and the vehicle B are available at location related to the first charging source 402A. In some cases, for example, the period of availability of the vehicle A is 11 am-3 pm, and the period of availability of the vehicle B is 3 pm-5 pm. Therefore, the priority order of the vehicle A may be in a first order, and the priority order of the vehicle B may be in a second order. Based on the completion of the priority order determination operation, the circuitry 202 may proceed to the scheduling information generation.

At 406, scheduling information generation operation may be executed. In an embodiment, the circuitry 202 may be configured to generate scheduling information based on the determined priority order. The scheduling information may indicate an order of charging or exact timing to charge each vehicle of the plurality of vehicles. In some cases, the vehicle A and the vehicle B may be available at a location related to the second charging source 402B. For example, the period of availability of the vehicle A is 11 am-3 pm, and the period of availability of the vehicle B is 2 pm-5 pm. Therefore, when charging schedule is generated based on the determined priority order, the vehicle A may be charged in a first order, and the vehicle B may be charged in a second order. The vehicle A may be charged from 11 am-3 pm, and vehicle B may be charged from 3 pm-5 pm. The generated charging schedule may be outputted or displayed in the user Interface 108 of the display device 106 associated with the electronic device 102.

At 408, output notification operation may be executed. In an embodiment, the circuitry 202 may be configured to output the notification based on the generated scheduling information (generated at 406). For example, the generated schedule information may be output on the user interface 108 of the display device 106 as the visual insights. For example, as displayed on the user interface 108 in FIG. 4, there may be shown a plurality of vehicles in queue 410 at a corresponding charging source (such as, one of: the first charging source 104A or the second charging source 104B). The plurality of vehicles in queue 410 may include a first vehicle 410A, a second vehicle 410B, and a third vehicle 410C. In an embodiment, the electronic device 102 may generate a charging schedule 412 for each vehicle of the plurality of vehicles in queue 410, based on the priority order and the scheduling information generated for each vehicle of the plurality of vehicles in queue 410. The generated charging schedule 412 may indicate that the third vehicle 410C is in a first order of the charging schedule 412, the first vehicle 410A is in a second order of the charging schedule 412, and the second vehicle 410B is a third order of the charging schedule 412, generated based on the availability information of each of the plurality of vehicles in the queue 410. The generated charging schedule 412 may be displayed, as the visual insights, on the user interface 108 for the user of the electronic device 102. This may enable the user (like a manager or an executive) of the electronic device 102 to know about the availability of the plurality of vehicles on real-time, and accordingly inform the driver or passenger of each of the plurality of vehicles about the generated scheduling information to charge their respective vehicle at the location of the charging source (i.e., either the first charging source 104A or the second charging source 104B) related with the electronic device 102. Therefore, based on the determined priority order and the scheduling information for each vehicle (such as the vehicle 114A) of the plurality of vehicles, the electronic device 102 may route each vehicle (such as the vehicle 114A) of the plurality of vehicles to the corresponding charging source (such as the first charging source 104A or the second charging source 104B). Such routing may avoid crowding of the plurality of vehicles at a specific charging source and thus, effectively manages and optimizes the energy usage of available charging sources (such as, the first charging source 104A or the second charging source 104B).

Figure 5:
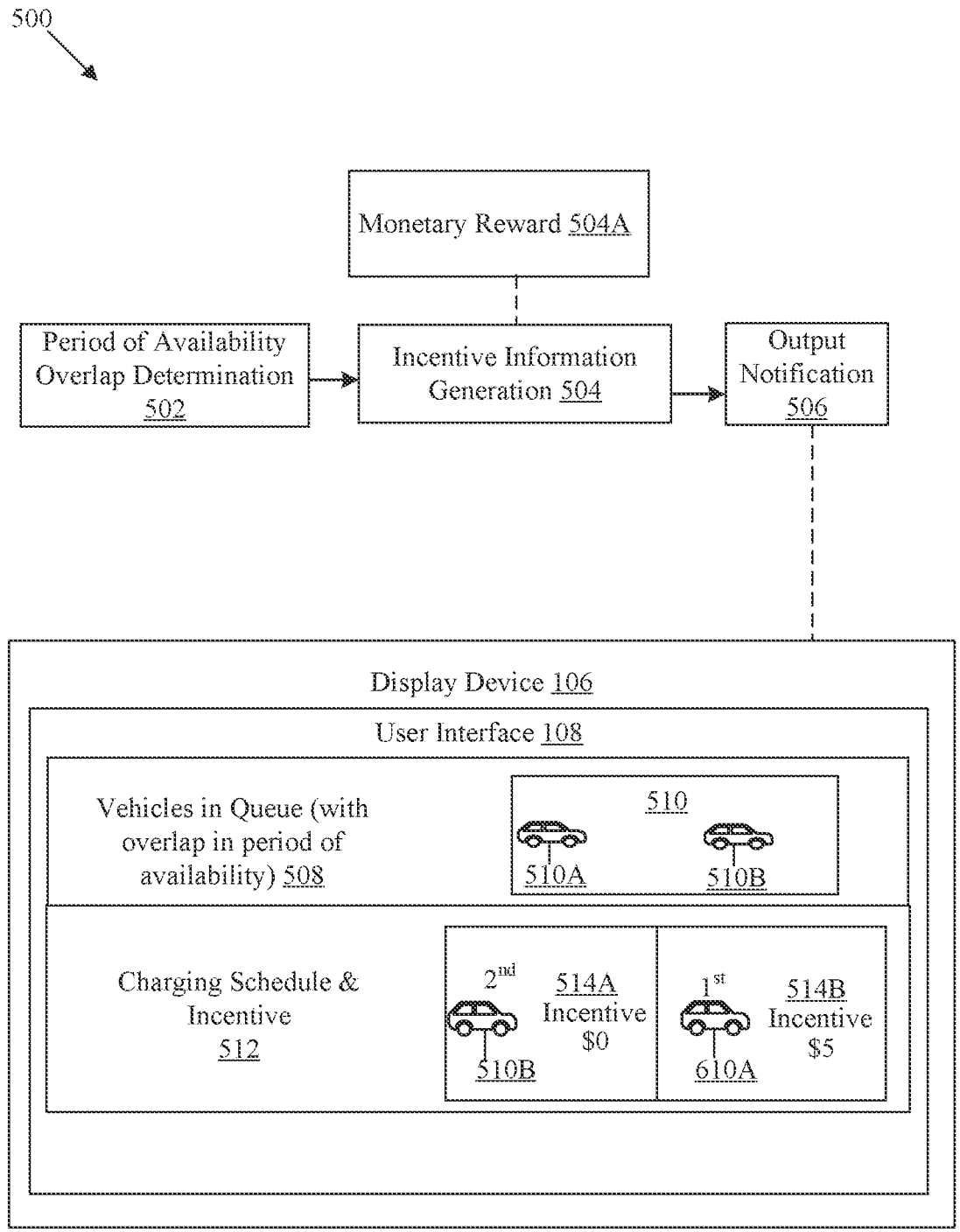
FIG. 5 is a diagram that illustrates an exemplary execution pipeline for prioritizing and scheduling charging event based on an overlap in availability of vehicles, in accordance with an embodiment of the disclosure.

FIG. 5 is a diagram that illustrates an exemplary execution pipeline for prioritizing and scheduling charging event based on an overlap in availability information of vehicles, in accordance with an embodiment of the disclosure. FIG. 5 is explained in conjunction with elements from FIG. 1, FIG. 2, FIG. 3, and FIG. 4. With reference to FIG. 5, there is shown an exemplary execution pipeline 500. The execution pipeline may include a set of operations (502 to 506) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 5) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 502, period of availability overlap determination operation may be executed. In an embodiment, the circuitry 202 may be configured to determine an overlap in the period of availability of at least two vehicles of the plurality of vehicles. In a first scenario, the vehicle A and the vehicle B may be present at a location related to a first charging source 402A. In some cases, the first vehicle A may be available to get charged from 2 pm-5 pm, and the vehicle B might be available to get charged from 3 pm-6 pm. Based on the comparison of the period of availability of the first vehicle A and the second vehicle B, it may be observed that there may be an overlap in the period of availability of the vehicle A and the vehicle B for charging. Based on the overlap, the circuitry 202 may schedule charging for each vehicle or few vehicles of the plurality of vehicles (i.e., the vehicle A or the vehicle B) with another charging source or a nearest charging source (i.e., one of: the first charging source 104A or the second charging source 104B). In another embodiment, the circuitry 202 may adjust the scheduled charging period of at least one vehicle of the plurality of vehicles. The schedule of charging or location of charging a particular vehicle may be included in the scheduling information generated by the electronic device based on the determined overlap in the period of availability. For example, if the period of availability of the vehicle A is between '10 am-1 pm' and the period of availability of the vehicle B is between '12 pm-2 pm, the circuitry 202 may shift (for example, prepone) the scheduled time for charging the vehicle A from '10 am-1 pm' to '9 am-12 pm' and the schedule time for charging the vehicle B remains same. The determination of overlap in the period of availability of at least two vehicles may help in adjusting the period of availability of each vehicle 404A of the plurality of vehicles, via the electronic device 102. In another example, if the period of availability of the vehicle A is between '10 am-1 pm' and the period of availability of the vehicle B is between '10 am-1 pm', the circuitry 202 may output the notification to the vehicle A to shift (for example, postpone) the scheduled time for charging the vehicle A from '10 am-1 pm' to '1 pm-4 pm' and the schedule time for charging the vehicle B remains same. In such cases, if the vehicle A accepts postponement of the charging schedule, the vehicle A may be provided with incentive information (in '$').

At 504, incentive information generation operation may be executed. In an embodiment, the circuitry 202 may be configured to generate incentive information based on the determined overlap. The incentive information may indicate a monetary reward 504A for a vehicle (such as the vehicle A) of the plurality of vehicles that performs charging later than other vehicles in the plurality of vehicles. The overlap of the charging schedule in the period of availability of the vehicles may be complete or partial. For example, in complete overlap in the period of availability, the period of availability of the vehicle A may be 1 pm-3 pm and the period of availability of the vehicle B is 1 pm-4 pm i.e., the period of availability of the vehicle A and vehicle B completely overlaps. In another example, in partial overlap in the period of availability, the period of availability of the vehicle A may be 10 am-1 pm and the period of availability of the vehicle B is 12 pm-3 pm i.e., the period of availability of the vehicle A and the vehicle B partially overlaps. In case of the overlap in the period of availability of the vehicles, users of the vehicles may be encouraged to charge the vehicle later than the other vehicles by providing a monetary incentive (in '$'). For example, if the period of availability of the vehicle A and the vehicle B overlaps, and if the user of the vehicle A accepts or plans to charge his/her vehicle later than the vehicle B, the circuitry 202 may generate monetary incentive for the user of the vehicle A.

At 506, output notification operation may be executed. In an embodiment, the circuitry 202 may be configured to output the notification based on the generated scheduling information and the incentive information. The generated incentive information may be output or displayed on the user interface 108 of the display device 106. For example, as displayed on the user interface 108 (as shown in FIG. 5), vehicles in queue 508 at a corresponding charging source (any of the first charging source 104A, and the second charging source 104B) may have a plurality of vehicles 510 (such as a first vehicle 510A and a second vehicle 510B). In certain cases, the first vehicle 510A and the second vehicle 510B may have the overlap in the period of availability of the charging schedule. The circuitry 202 may further generate a charging schedule and incentive 512 based on the period of availability and the corresponding overlap in the charging schedule of the plurality of vehicles 510. Based on the generated charging schedule and incentive 512, the circuitry 202 may transmit the notification to the first vehicle 510A to charge in a second priority order and further transmit the notification to the second vehicle 510B to charge in a first priority order. In case if the first vehicle 510A accepts the delayed charging schedule, the circuitry 202 may calculate and transmit a first incentive 514A (for example, 5$ incentive value) to the first vehicle 510A or to a personal device or financial account associated with a user of the first vehicle 510A. Further, as the second vehicle 510B is given more priority compared to the first vehicle 510A for charging, the circuitry 202 may calculate and transmit a second incentive 514B (for example, 0$) to the second vehicle 510B or to a personal device or financial account associated with a user of the second vehicle 510B. In an embodiment, the second incentive 514B is lower than the first incentive 514A. As shown in FIG. 5, the circuitry 202 may output the generated scheduling information and the incentive information (as the notification) on the display device 106 for the users of the plurality of vehicles 510 or for the user associated with the electronic device 102. Therefore, based on the determined period of availability overlap and the corresponding incentive information generation for each vehicle (such as the vehicle 114A) of the plurality of vehicles, the electronic device 102 may route each vehicle (such as the vehicle 114A) of the plurality of vehicles to the corresponding charging source (such as the first charging source 104A or the second charging source 104B). Such routing may avoid waiting and crowding of the plurality of vehicles at the specific charging source and thus, effectively manages and optimizes the energy usage of available charging sources (such as, the first charging source 104A or the second charging source 104B).

Figure 6:
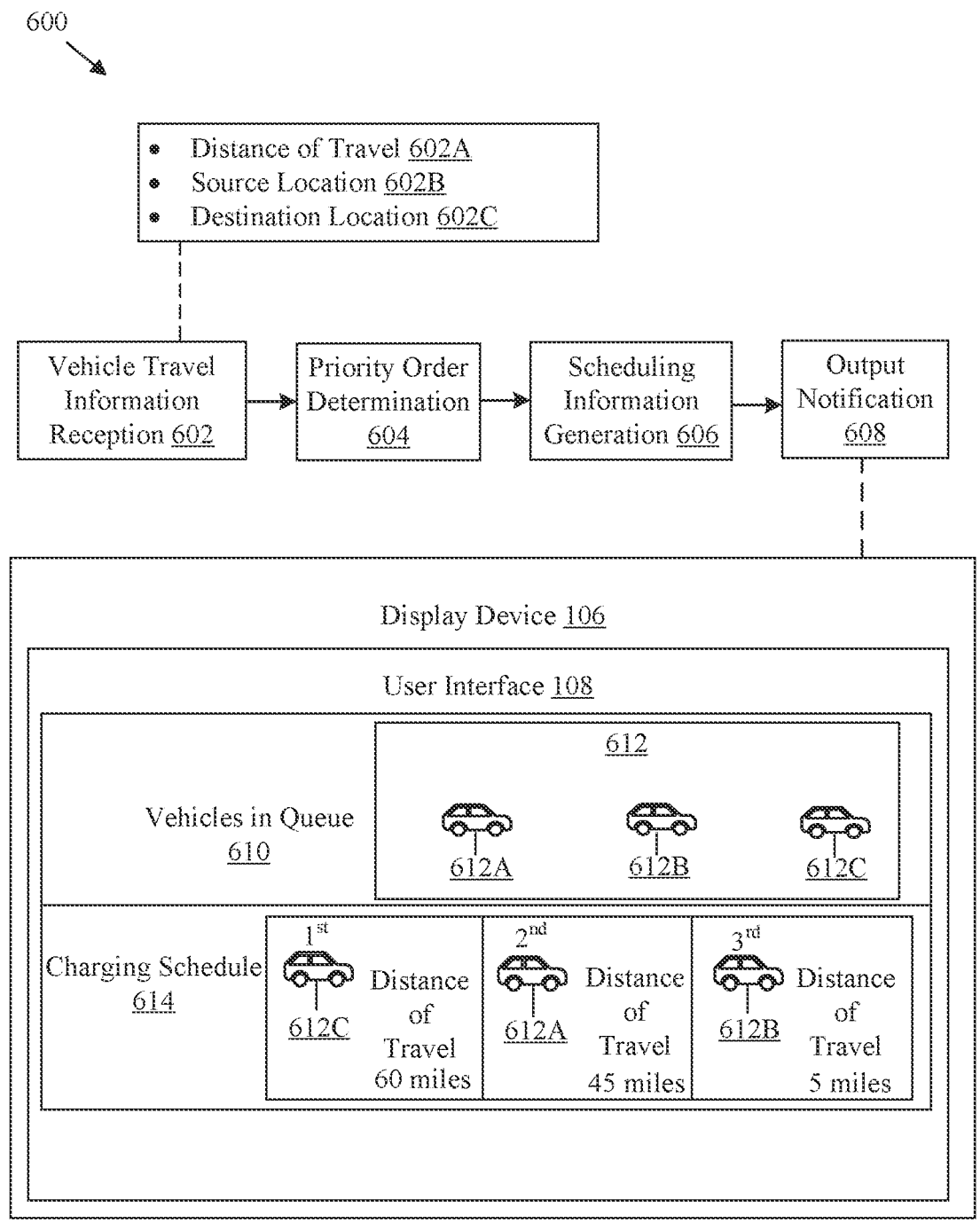
FIG. 6 is a diagram that illustrates an exemplary execution pipeline for prioritizing and scheduling charging event based on travelling information of vehicles, in accordance with an embodiment of the disclosure.

FIG. 6 is a diagram that illustrates an exemplary execution pipeline for prioritizing and scheduling charging event based on travelling information of vehicles, in accordance with an embodiment of the disclosure. FIG. 6 is explained in conjunction with elements from FIG. 1, FIG. 2, FIG. 3, FIG. 4 and FIG. 5. With reference to FIG. 6, there is shown an exemplary execution pipeline 600. The execution pipeline may include a set of operations (602 to 608) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 6) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 602, vehicle travel information reception operation may be performed. In the vehicle travel information reception operation, the circuitry 202 may be configured to receive traveling information of a plurality of vehicles associated with at least one of: the first charging source 104A and the second charging source 104B. The traveling information may correspond to a forecast on a distance of travel of each vehicle of the plurality of vehicles from a source location to a destination location. For example, for the vehicle A, a destination location may be 5 miles away from a respective source location (like from home or workplace of a user of the vehicle A) or from a location of the first charging source 104A or the second charging source 104B. In another example, for the vehicle B, a destination location is 15 miles away from a respective source location (like from home or work place of a user of the vehicle B) or from the first charging source 104A or the second charging source 104B. In such a case, a forecast on a distance of travel 602A from a source location 602B (for example, a location of a user home) to the destination location 602C (for example, a location of planned trip, etc.) may help to determine the priority order of charging the vehicle A and the vehicle B. In an embodiment, the circuitry 202 may receive the traveling information of the plurality of vehicles from a communication device (not shown) associated with each of the plurality of vehicles or associated with a user (driver or passenger) of each of the plurality of vehicles.

At 604, priority order determination operation may be executed. In an embodiment, the circuitry 202 may be configured to determine a priority order for each vehicle of the plurality of vehicles to charge from at least one of: the first charging source 104A and the second charging source 104B, based on the received traveling information. For example, for each vehicle of the plurality of the vehicles, the traveling information (such as the source location 602B and the destination location 602C) may be received. Based on the received travelling information, the circuitry 202 may determine a required SOC to reach the destination location 602C for each of the plurality of vehicles. In case the required SOC is lesser than a current SOC of the vehicle, such vehicle may be given more priority, based on a distance between the source location 602B and the destination location 602C, and corresponding difference between the required SOC and the current SOC for corresponding vehicle. In an example, based on comparison of SOC for each vehicle of the plurality of vehicles, the vehicle with least amount of SOC may be allocated higher priority order for charging the vehicle. For example, there are two vehicles (such as, the vehicle A and the vehicle B) in queue for charging at the first charging source 104A. In a first scenario, the circuitry 202 may determine that the vehicle A has the SOC of 50% i.e., a current residual SOC that may be left in the battery pack of vehicle A. The circuitry 202 may determine that the vehicle B has the SOC of 20%. Further, the circuitry may also determine that the vehicle B may need to travel for a longer distance compared to the vehicle A based on the received travelling information for each of the vehicle A and the vehicle B. Therefore, the circuitry 202 may transmit the notification to the vehicle B to have a first priority order, and further transmit the notification to the vehicle A to have a second priority order for the charging. In an embodiment, the second priority order is lesser than the first priority order. Based on the determined priority order, the circuitry 202 may generate a schedule for charging the plurality of vehicles at a corresponding charging source (i.e., one of: the first charging source 104A, and the second charging source 104B).

At 606, scheduling information generation operation may be executed. In the scheduling information generation operation, the processor 202A may be configured to generate scheduling information based on the determined priority order for the plurality of vehicles. The scheduling information may indicate an order or exact timing of charging of each vehicle of the plurality of vehicles. For example, vehicles (such the vehicle A and the vehicle B) are in queue for charging at the second charging source 104B, and the vehicle B is determined to have a higher priority order, and the vehicle A is determined to have a lower priority order due to respective current SOC and the travelling information. Therefore, the charging schedule (as the scheduling information) may be generated based on the determined priority order, and accordingly the vehicle B may be charged first, and the vehicle A may be charged second. The generated charging schedule may be presented or displayed on the user interface 108 (as the notification) of the display device 106. In an embodiment, the generated charging schedule may be transmitted to the communication device related to each of the plurality of vehicles so that the users related to the plurality of vehicles may be aware about their respective schedule and priority for charging at a particular charging source.

At 608, output notification operation may be executed. In the output notification operation, the processor 202A may be configured to output the notification based on the generated scheduling information. The generated schedule information may be output on the user interface 108 of the display device 106. For example, as displayed on the user interface 108 (shown in FIG. 6), vehicles in queue 610 at a corresponding charging source (any of the first charging source 104A, and the second charging source 104B) may include the plurality of vehicles 612 (such as a first vehicle 612A, a second vehicle 612B, and a third vehicle 612C). The charging schedule 614 may be generated for the plurality of vehicles 612 based on the received travelling information and current SOC determined for each of the plurality of vehicles 612. The generated charging schedule 614 may indicate that the third vehicle 612C is at a first place in the charging schedule 614, and the first vehicle 612A is at a second place in the charging schedule 614, and the second vehicle 612B is at a third place in the charging schedule 614 due to different distance to be travelled by respective vehicle (as shown in FIG. 6). As shown in FIG. 6, the circuitry 202 may output the generated scheduling information (as the charging schedule 614) for the plurality of vehicles 612 (as the notification) on the display device 106 for the users of the plurality of vehicles 612 or for the user associated with the electronic device 102. Therefore, based on the determined vehicle travel information and the corresponding priority order determination for each vehicle (such as the vehicle 114A) of the plurality of vehicles, the electronic device 102 may prioritize a charging order of each vehicle (such as the vehicle 114A) of the plurality of vehicles to the corresponding charging source (such as the first charging source 104A or the second charging source 104B). Such charging order may effectively allow the vehicle that critically requires charging to reach the destination location and optimizes the energy usage of available charging sources (such as, the first charging source 104A or the second charging source 104B).

Figure 7:
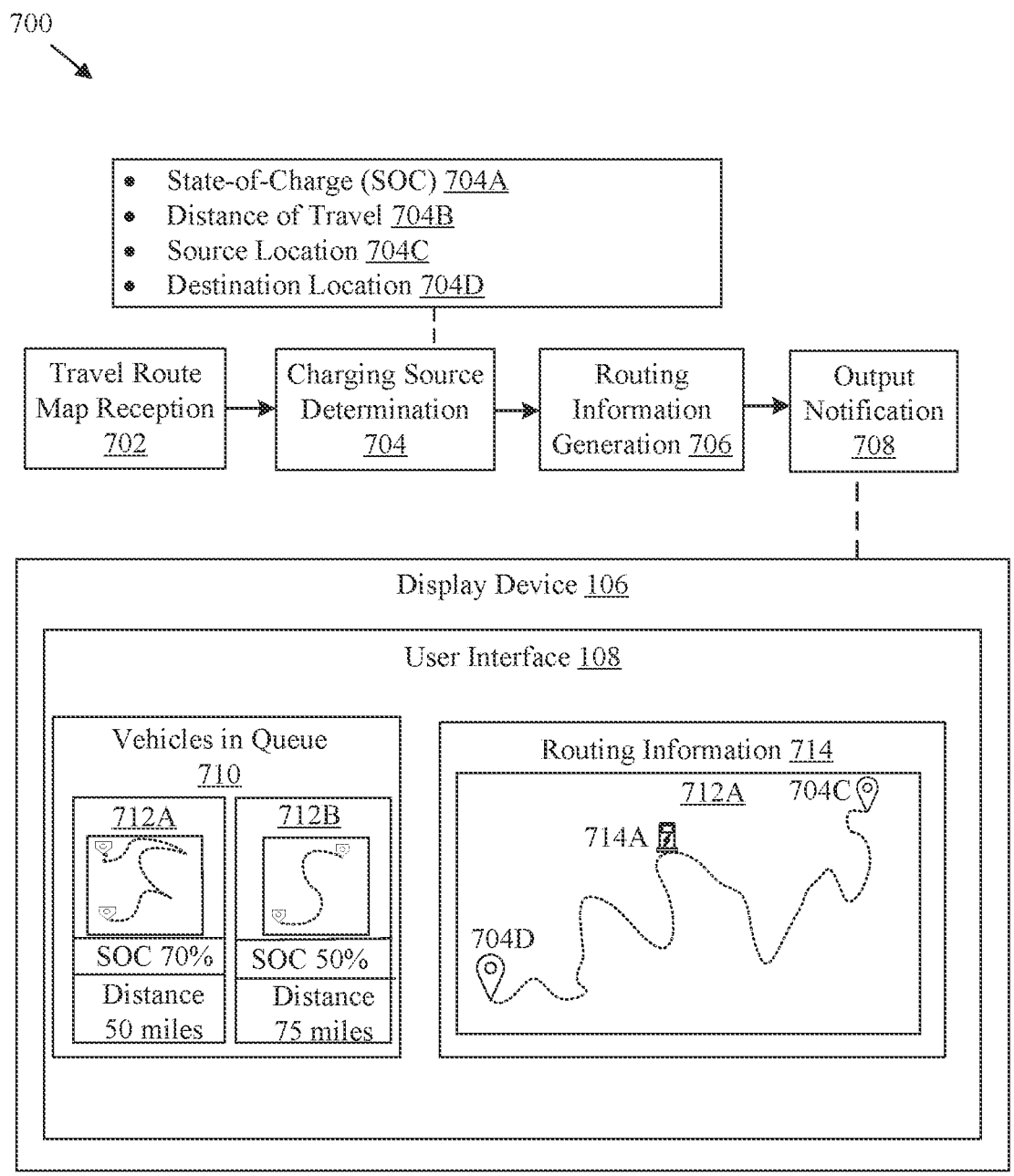
FIG. 7 is a diagram that illustrates an exemplary execution pipeline for prioritizing and scheduling charging event based on a route map of travel in travelling information of vehicles, in accordance with an embodiment of the disclosure.

FIG. 7 is a diagram that illustrates an exemplary execution pipeline for prioritizing and scheduling charging event based on a route map of travel in travelling information of vehicles, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary execution pipeline 700. The execution pipeline may include a set of operations (702 to 708) that may be executed by one or more components of FIG. 1, such as, the electronic device 102 or the circuitry 202 in FIG. 2. The set of operations may be performed by the electronic device 102 or the circuitry for the energy management of the charging sources to optimize energy usage. In an embodiment, the electronic device 102 (performing the set of operations in FIG. 7) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 702, travel route map reception operation may be executed. In an embodiment, the circuitry 202 may be configured to receive information about a route map of travel of each vehicle of the plurality of vehicles from the source location to the destination location. For example, for the vehicle A, a route map A may be received. For vehicle B, a route map B may be received. In an embodiment, the circuitry 202 may receive the information about the route map of the travel for each of the plurality of vehicles from the communication device (not shown) associated with each of the plurality of vehicles or associated with the user (driver or passenger) of each of the plurality of vehicles. In an example, the communication device of the user of the particular vehicle may receive inputs about the source location and the destination location, determine the route map based on the received inputs, and further share the information about the determined route map to the electronic device 102.

At 704, charging source determination operation may be executed. In an embodiment, the circuitry 202 may be configured to determine charging sources located in the route map for each vehicle of the plurality of vehicles. The charging sources may be determined based on a state-of-charge (SOC) 704A of each vehicle of the plurality of vehicles and a distance of travel 704B of each vehicle of the plurality of vehicles from the source location 704C to a destination location 704D. In an example, for vehicle A, the route map A may be received, the SOC 704A for the vehicle A may be at 50%, and the distance of travel 704B from the source location 704C to the destination location 704D may be 70 miles. Based on the received route map, the SOC 704A, and the distance of travel 704B of the plurality of vehicles, one or more charging sources may be determined within the route map for each vehicle.

At 706, routing information generation operation may be executed. In an embodiment, the circuitry 202 may be configured to generate routing information based on the determined charging sources for each of the plurality of vehicles. The routing information may indicate exact location of the charging sources located in the route map. For example, in case the vehicle A is scheduled to travel on the route map (such as the route map A), the circuitry 202 may determine the SOC 704A and available charging sources in the route map of the vehicle A, to further determine a nearest charging source (such as the second charging source 104B) within or from the route map, and may generate the routing information for the vehicle A. The generated routing information may assist the user (the driver or the passenger) of the vehicle A to easily locate the determined nearest charging source in the route map to be followed by the vehicle A. The generated routing information may be further displayed on the ser interface 108 of the display device 106, as shown in FIG. 7.

At 708, output notification operation may be executed. In an embodiment, the circuitry 202 may be configured to output the notification based on the generated routing information. The generated routing information may be output (as the notification) on the user interface 108 of the display device 106. For example, as displayed on the user interface 108 (shown in FIG. 7), the circuitry 202 may be configured to display a vehicles in queue 710 at a corresponding charging source (such as one of: the first charging source 104A, and the second charging source 104B). The vehicles in queue 710 may include a first vehicle, and a second vehicle). Based on a route map 712A for the first vehicle and a route map 712B for the vehicle B in the vehicles in queue 710, the circuitry 202 may generate a routing information 714 for each vehicle of the vehicles in queue 710. In an example, the routing information 714 for the first vehicle, may be generated based on: the received information about the route map 712A for the first vehicle of the vehicles in queue 710, the SOC 704A for the first vehicle, and the distance of travel 704B from the source location 704C to the destination location 704D for the first vehicle. The generated routing information 714 may indicate a nearest charging source 714A (such as the second charging source 104B) within/from the route map 712A for the vehicle, and display information about the nearest charging source 714A in the routing information 714, as shown in FIG. 7. As shown in FIG. 7, the circuitry 202 may output the generated routing information 714 for each of the plurality of vehicles (as the notification) on the display device 106, for the users of the plurality of vehicles 612 or for the user associated with the electronic device 102. Therefore, based on the determined route map and the routing information corresponding to the determined charging source for each vehicle (such as the vehicle 114A) of the plurality of vehicles, the electronic device 102 may indicate a nearest charging source for the vehicle, which allows the vehicle to spend a minimal fuel to reach such nearest charging source and optimizes the energy usage of the vehicle and the available charging sources (such as, the first charging source 104A or the second charging source 104B).

Figure 8:
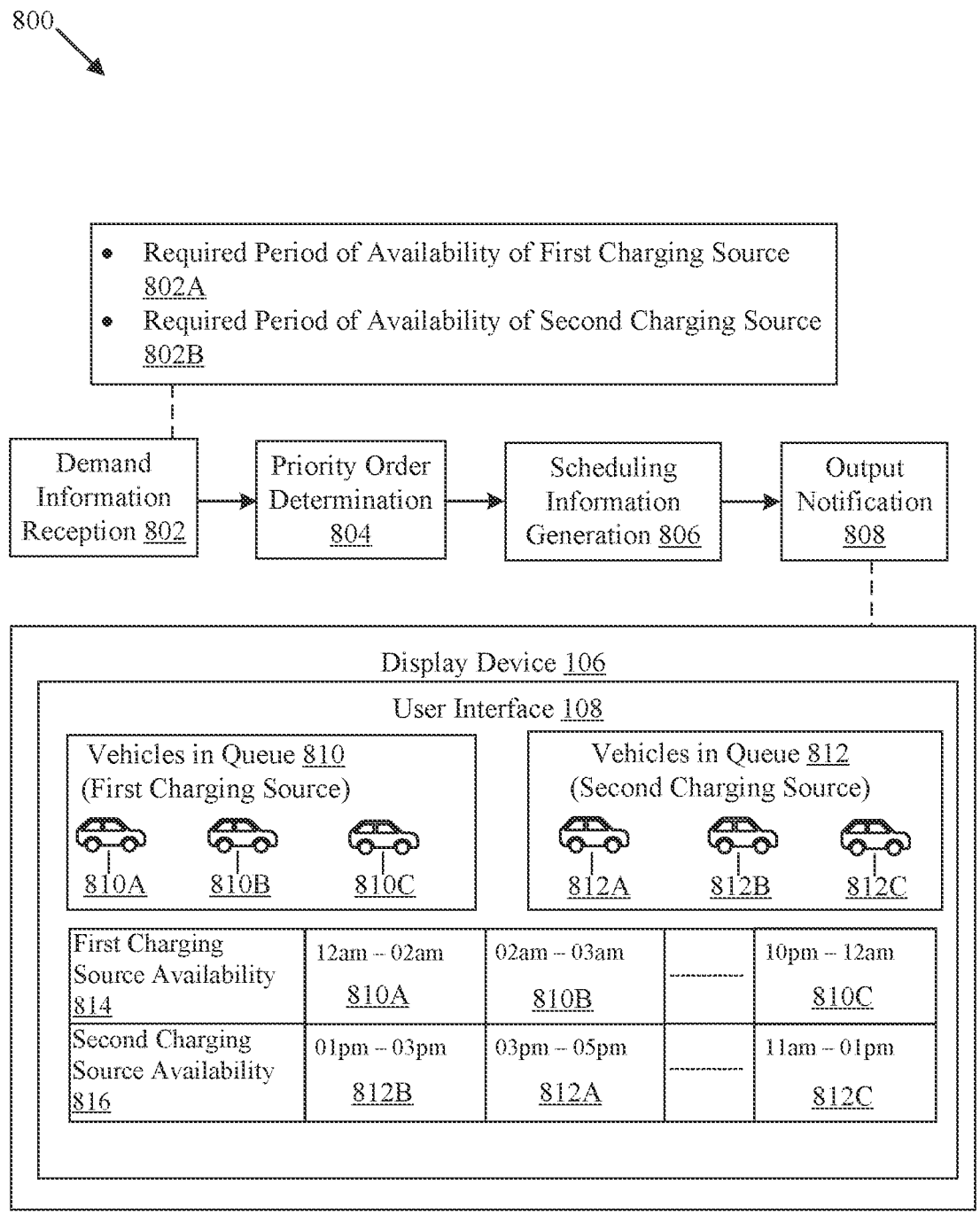
FIG. 8 is a diagram that illustrates an exemplary execution pipeline for prioritizing and scheduling charging event based on a period of availability of charging sources, in accordance with an embodiment of the disclosure.

FIG. 8 is a diagram that illustrates an exemplary execution pipeline for prioritizing and scheduling charging event based on a period of availability of charging sources, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary execution pipeline 800. The execution pipeline may include a set of operations (802 to 808) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 8) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles.

At 802, demand reception operation may be executed. In an embodiment, the circuitry 202 may be configured to receive demand information of at least one of: the first charging source 104A and the second charging source 104B. The demand information may indicate a required period of availability of at least one of: the first charging source 104A or the second charging source 104B, to charge at least one vehicle of the plurality of vehicles. The demand information may be received from a communication device (not shown) associated with a particular device or associated with the user of the particular device to be charged by at least one of the first charging source 104A and the second charging source 104B. In an embodiment, the circuitry 202 may receive the demand information (related to the particular vehicle) from the server 112. For example, the demand information may include a required period of availability of a first charging source 802A and a required period of availability of a second charging source 802B, as shown in FIG. 8. For example, the first charging source 104A may have multiple charging slots or availability (such as, 7 am-8 am, 8 am-9 am, etc.). In some cases, the vehicle A may intend or demand to charge from 10 am-12 pm at the second charging source 104B and the vehicle B may intend or demand to charge from 3 pm-5 pm at the second charging source 104B. In such cases, the demand information of the second charging source 104B may correspond to the charging slots that are available other than the charging slot required by the vehicle A and the charging slot required by the vehicle B. As the charging slots of the vehicle A is 10 am-12 pm and the vehicle B is 3 pm-5 pm, the charging slots of the second charging source 104B (for example 12 pm-2 pm) may be available for other vehicles. Based on a completion of the demand information reception operation, the circuitry 202 may determine a priority order of each of the plurality of vehicles.

At 804, priority order determination operation may be executed. In an embodiment, the circuitry 202 may be configured to determine a priority order for each vehicle of the plurality of vehicles to get charged from at least one of: the first charging source 104A and the second charging source 104B, based on the received demand information. For example, the circuitry 202 may receive the demand information for each vehicle of the plurality of vehicles. The circuitry 202 may compare the received demand information between each vehicle of the plurality of vehicles to determine the priority order of each vehicle. For example, there may be two vehicles (such as, the vehicle A and the vehicle B) in queue for charging at the second charging source 104B. Based on the received demand information of the vehicle A and the vehicle B, the circuitry 202 may determine that the vehicle A has the demand of 10 am-1 pm to be charged at the second charging source 104B and the vehicle B has the demand of 3 pm-5 pm to be charged at the second charging source 104B. As the demand information (such as, the required period of availability) of the vehicle A and vehicle B does not overlap from each other, and the vehicle A may get the charging slot of 10 am-1 pm from the second charging source 104B, which may be earlier than the charging slot of the vehicle B. The circuitry 202 may further output the notification to the vehicle A with information about a higher priority order and notification to the vehicle B with information about a lower priority order to get charged. Based on a completion of the priority order determination, the circuitry 202 may proceed for scheduling information generation operation.

At 806, scheduling information generation operation may be executed. In an embodiment, the circuitry 202 may be configured to generate scheduling information based on the determined priority order. The scheduling information may indicate an order of charging (or exact time schedule to get charged) for each vehicle of the plurality of vehicles. For example, from the vehicles (such as, the vehicle A and the vehicle B) in queue for charging at the second charging source 104B, the vehicle A may be determined to have a higher priority order, and the vehicle B may be determined to have a lower priority order. Therefore, when charging schedule (i.e., indicated by the scheduling information) is generated based on the determined priority order, the vehicle A may be scheduled to charge in a first order, and the vehicle B may be scheduled to be charged in a second order at a particular charging sources (such as the second charging source 104B). The generated charging schedule may be displayed on the user interface 108 of the display device 106, as shown FIG. 8.

At 808, output notification operation may be executed. In an embodiment, the circuitry 202 may be configured to output the notification based on the generated scheduling information. The generated schedule information may be output (as the notification) on the user interface 108 of the display device 106. The notification based on the schedule information is shown, for example, in FIGS. 3 and 4.

In FIG. 8, there is further shown a vehicles in queue 810 at the first charging source 104A. The vehicles in queue 810 may have a plurality of vehicles (such as first vehicle 810A, a second vehicle 810B, and a third vehicle 810C). In another example, as displayed on the user interface 108, there is shown a vehicles in queue 812 at the second charging source 104B. The vehicles in queue 812 may have a plurality of vehicles (such as first vehicle 812A, a second vehicle 812B, and a third vehicle 812C). The circuitry 202 may also display the availability information of the charging sources in the UI 108. For example, the circuitry 202 may be configured to display, via the user interface 108, a first charging source availability 814 for the first charging source 104A. For example, the first charging source availability 814 may include a plurality of charging slots (such as, 12 am-2 am, 2 am-3 am . . . 10 pm-12 am, etc.) available for the vehicles in queue 810. In another example, the circuitry 202 may be configured to display, via the user interface 108, a second charging source availability 816 for the second charging source 104B. The second charging source availability 816 may include a plurality of charging slots (such as, 1 pm-3 pm, 3 pm-5 pm . . . 11 am-1 pm, etc.) available for the vehicles in queue 812.

Based on the first charging source availability 814 and the second charging source availability 816, the circuitry 202 may allot charging slot for each vehicle of the plurality of vehicles. For example, as shown in the FIG. 8, at the first charging source availability 814, a first charging slot (i.e., 12 am-2 am) may be allocated to the first vehicle 810A, a second charging slot (i.e., 2 am-3 am) may be allocated to the second vehicle 810B, and a third charging slot (i.e., 10 pm-12 am) may be allocated to the third vehicle 810C. Similarly, at the second charging source availability 816, a first charging slot (i.e., 1 pm-3 pm) may be allocated to the second vehicle 812B, a second charging slot (i.e., 3 pm-5 pm) may be allocated to the first vehicle 812A, and a third charging slot (i.e., 11 am-1 pm) may be allocated to the third vehicle 812C. In an embodiment, the circuitry 202 may allocate charging slots for the vehicles based on the demand information received as described, for example, at 802-804. The circuitry 202 may display, via the user interface 108, the allocated charging slots (as the notification), such the user related to the electronic device 102 and the charging source may be aware on real-time which vehicle has to be charged at which particular charging slot of the charging source. In an embodiment, the electronic device 102 may transmit such notification to the vehicles, such that the user (i.e., driver) of the vehicle may be aware of the exact allocated time of charging at a particular charging source. Therefore, based on the determined demand and the priority order corresponding to the determined demand for each vehicle (such as the vehicle 114A) of the plurality of vehicles, the electronic device 102 may route each vehicle (such as the vehicle 114A) of the plurality of vehicles to the corresponding charging source (such as the first charging source 104A or the second charging source 104B). Such routing may minimize demand and subsequent crowding of the plurality of vehicles at the specific charging source and thus, effectively manages the energy usage of available charging sources (such as, the first charging source 104A or the second charging source 104B).

Figure 9:
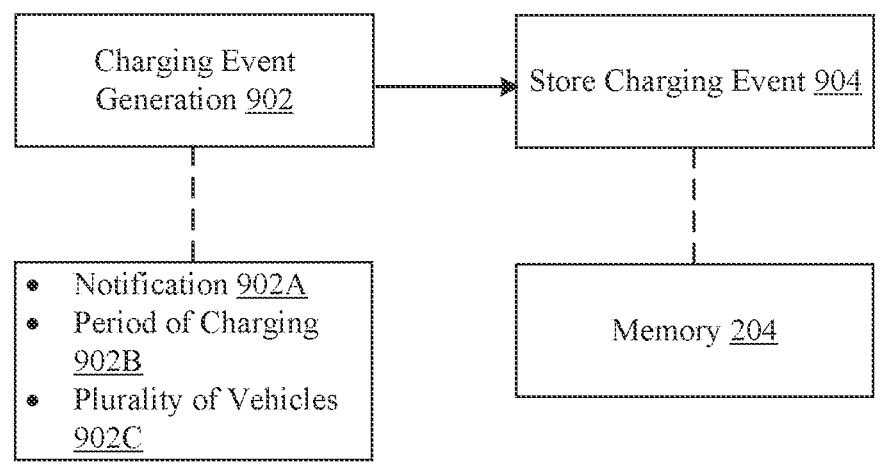
FIG. 9 is a diagram that illustrates an exemplary execution pipeline for generating and storing a charging event of vehicles, in accordance with an embodiment of the disclosure.

FIG. 9 is a diagram that illustrates an exemplary execution pipeline for generating and storing a charging event of vehicles, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an exemplary execution pipeline 900. The execution pipeline may include a set of operations (902 to 904) that may be executed by one or more components of FIG. 1, such as, the electronic device 102. The set of operations may be performed by the electronic device 102 for energy management of charging sources to optimize energy usage.

At 902, charging event generation operation may be executed. In an embodiment, the circuitry 202 may be configured to generate a charging event based on the notification. The charging event may correspond to a period of charging 902B for each vehicle of a plurality of vehicles 902C associated with at least one of: the first charging source 104A and the second charging source 104B. The notification 902A may be generated based on the generated visual insights, the charging cost, and the corresponding carbon footprint as described, for example, in FIG. 1. For example, as described in FIG. 1, the electronic device 102 associated with the user of a particular vehicle may assist the user to select the charging source (like one of the first charging source 104A or the second charging source 104B), where the charging would be more cost effective and carbon emission would be less. Based on such selection and notification, the circuitry 202 of the electronic device 102 (i.e., related to the user of the vehicle to be charged) may generate an event (like calendar event) for charging the vehicle at selected charging source which has higher cost and carbon saving. The generated event (indicating an exact schedule or period of charging) may facilitate the user of the vehicle to timely charge the vehicle at the selected charging source.

At 904, charging event store operation may be executed. In an embodiment, the circuitry 202 may be configured to store, in the memory 204 associated with the electronic device 102, the generated charging event for each vehicle of the plurality of vehicles. The stored event may facilitate or remind the user (like driver) of the vehicle to timely reach the location of the selected charging source where the user may achieve higher cost saving and carbon saving.

Figure 10:
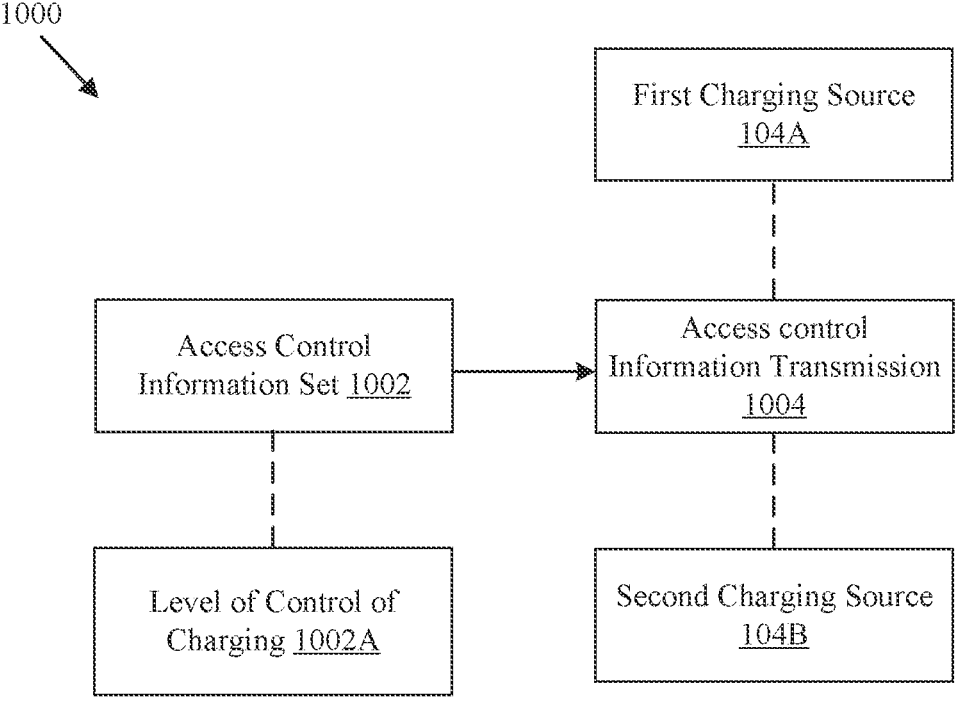
FIG. 10 is a diagram that illustrates an exemplary execution pipeline for setting access control information for charging the vehicles, in accordance with an embodiment of the disclosure.

FIG. 10 is a diagram that illustrates an exemplary execution pipeline for setting access control information for charging the vehicles, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary execution pipeline 1000. The execution pipeline may include a set of operations (1002 to 1004) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 10) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 1002, access control information set operation may be executed. In an embodiment, the circuitry 202 may be configured to set access control information for each vehicle of a plurality of vehicles associated with at least one of: the first charging source 104A and the second charging source 104B. The access control information may correspond to a level of control of charging 1002A, for each vehicle of the plurality vehicles, from at least one of: the first charging source 104A and the second charging source 104B. The access control information (such as, the level of control of charging 1002A) may be set for the plurality of vehicles to control charging of the plurality of vehicles. For example, in some cases, the vehicle A and the vehicle B may be associated with the first charging source 104A and the second charging source 104B, respectively. Based on the level of charging 1002A, the vehicle A and the vehicle B may be charged. The level of charging 1002A may correspond to at least one of: an amount of charge limit for each vehicle of the plurality of vehicles, an amount of time limit for charging each vehicle of the plurality of vehicles, and the like. The electronic device 102 associated with the charging source may set certain limits (like amount of charge or time for charging) for the associated charging source based on inputs received from the user (like a manager, an operator, or an executive) of the charging source.

At 1004 access control information transmission operation may be executed. In an embodiment, the circuitry 202 may be configured to transmit the access control information to at least one of: the first charging source 104A and the second charging source 104B, to allow charging of each vehicle of the plurality of vehicles, from at least one of: the first charging source 104A and the second charging source 104B. For example, the access control information associated with the vehicle A and the vehicle B may be transmitted to the first charging source 104A and the second charging source 104B, respectively, to enable charging of the corresponding vehicles. The transmitted access control information may be further shared and rendered by the communication device of the associated vehicle so that the driver or passenger of the corresponding vehicle may be well aware of the charging limits defined in the access control information. Thus, the disclosed electronic device 102 associated with one or more charging sources may enable the user (like operator) of such charging source, to manage the charging source, set charging-based limits for vehicles, and effectively optimize energy usage. Therefore, based on the access control information for each charging source, the electronic device 102 may control access of each vehicle (such as the vehicle 114A) of the plurality of vehicles to the corresponding charging source (such as the first charging source 104A or the second charging source 104B). Such controlled access may facilitate a limited charging for each vehicle of the plurality of vehicles at the specific charging source and thus, effectively manages and optimizes the energy usage of available charging sources (such as, the first charging source 104A or the second charging source 104B).

Figure 11:
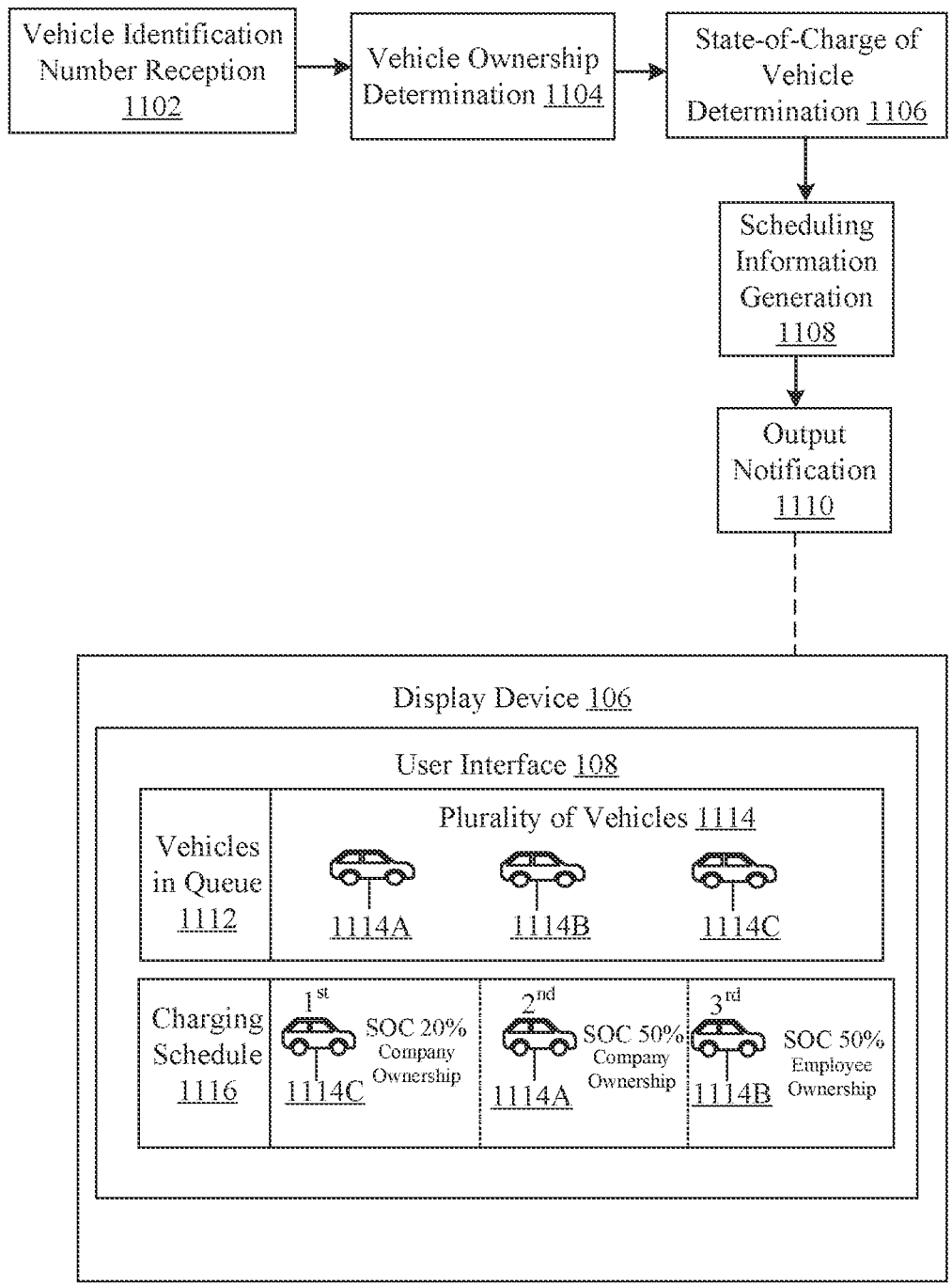
FIG. 11 is a diagram that illustrates an exemplary execution pipeline for scheduling vehicle charging based on ownership of vehicles, in accordance with an embodiment of the disclosure.

FIG. 11 is a diagram that illustrates an exemplary execution pipeline for scheduling vehicle charging based on ownership of vehicles, in accordance with an embodiment of the disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown an exemplary execution pipeline 1100. The execution pipeline may include a set of operations (1102 to 1108) that may be executed by one or more components of FIG. 1, such as, the electronic device 102 or the circuitry 202 in FIG. 2. The set of operations may be performed by the electronic device 102 for energy management of charging sources to optimize energy usage. In an embodiment, the electronic device 102 (performing the set of operations in FIG. 11) may be associated with a charging source (like the first charging source 104A and the second charging source 104B) and may facilitate a plurality of vehicles 114 to be charged. For example, the electronic device 102 may be a management device/server or a control device which may control or manage the first charging source 104A and/or the second charging source 104B to facilitate charging for the plurality of vehicles 114.

At 1102, vehicle identification number reception operation may be executed. In an embodiment, the circuitry 202 may be configured to receive a vehicle identification number (for example, a registration number, an engine chassis number, etc.) associated with each vehicle of the plurality of vehicles. The vehicle identification number may include a number or an identifier that is unique to the vehicle. In an embodiment, the vehicle identification number may assist in a determination of an ownership of the vehicle. In an embodiment, the circuitry 202 may receive the vehicle identification number for each vehicle associated with one or more charging sources, from the server 112 or directly from the corresponding vehicle.

At 1104, vehicle ownership determination operation may be executed. In an embodiment, the circuitry 202 may be configured to compare the received vehicle identification number with each of a pre-stored vehicle identification numbers, to determine the ownership of the vehicle. For example, the vehicle identification number (such as, the registration number) that may be unique for every vehicle may be compared with a dataset that may be stored in the memory 204 or the server 112 and may include the pre-stored vehicle identification numbers for the plurality of vehicles. Based on comparison of the vehicle identification number with the prestored vehicle identification numbers, the ownership of the vehicle may be determined. The ownership of the vehicle may indicate that whether the vehicle is a company owned vehicle (such as, the vehicle is owned by a corporate office) or an employee owned vehicle (such as, the vehicle is personally owned by an employee of the corporate office). In some cases, the vehicle may be leased, partially owned, or used for commercial purpose (such as, taxi, cab etc.).

At 1106, state-of-charge (SOC) of vehicle determination operation may be executed. In an embodiment, the circuitry 202 may be configured to determine a state-of-charge for the vehicle based on the determined ownership. For example, in some cases, the vehicle A may be company owned, and the vehicle B may be employee owned. In such cases, the circuitry 202 may determine the SOC of the vehicle A (for example, at 50%) and the SOC of the vehicle B (for example, at 40%). In such cases, the circuitry 202 may prioritize the charging of the vehicle A (i.e., company owned) having SOC 50% compared to the vehicle B (i.e., employee owned) having SOC 40%.

At 1108, scheduling information generation operation may be executed. In an embodiment, the circuitry 202 may be configured to generate scheduling information based on the state-of-charge and the determined ownership. The scheduling information may indicate an order of charging of the vehicle at one of: the first charging source 104A or the second charging source 104B. For example, in case the vehicles (such as, the vehicle A and the vehicle B) are in queue for charging at the second charging source 104B, the vehicle A (i.e., company owned) and having SOC of 50% may be determined to have a higher priority order; and the vehicle B (i.e., employee owned) and having SOC 40% may be determined to have a lower priority order. Therefore, the circuitry 202 may generate a charging schedule (i.e., indicated by the scheduling information) for the vehicles in queue, based on the determined priority order. For example, the circuitry 202 may schedule charging of the vehicle A in a first order, and charging of the vehicle B in a second order. The generated charging schedule may be displayed in the user interface 108 of the display device 106.

At 1110, output notification operation may be executed. In an embodiment, the circuitry 202 may be configured to output the notification based on the generated scheduling information. The generated schedule information (as the notification) may be displayed on the user interface 108 of the display device 106. For example, as displayed on the user interface 108 in FIG. 11, there is shown a vehicles in queue 1112 at a corresponding charging source (such as, at the first charging source 104A, or at the second charging source 104B). The vehicles in queue 1112 may have a plurality of vehicles 1114 (such as a first vehicle 1114A (i.e., company ownership), a second vehicle 1114B (i.e., employee ownership), and a third vehicle 1114C (i.e., company ownership)). The circuitry 202 may further determine that the first vehicle 1114A has a first SOC (such as at 50%), the second vehicle 1114B has a second SOC (such as at 20%), and the third vehicle 1114C has a third SOC (such as at 50%). Based on the determined ownership and the SOC, the circuitry 202 may generate a charging schedule 1116 for the plurality of vehicles 1114. The priority order may be generated based on the received SOC and the determined ownership of each of the plurality of vehicles 1114. The generated charging schedule 1116 may indicate the priority order that the third vehicle 1114C having 20% SOC with company ownership may be charged in a first order of the charging schedule 1116, the first vehicle 1114A having 50% SOC with company ownership may be charged in a second order of the charging schedule 1116, and the second vehicle 1114B having 50% SOC with employee ownership may be charged in a third order of charging schedule 1116. As shown in FIG. 11, the generated charging schedule 1116 (as the scheduling information) may be rendered on the user interface 108 as the notification to the user of the electronic device 102. In an embodiment, the electronic device 102 (including the circuitry 202) may be associated with one or more charging sources to charge one more vehicles as described, for example, in FIG. 11. The notification may facilitate the user (like operator or manager) of the charging source to know the priority order, current SOC, and ownership of the vehicles being charged. Therefore, based on the priority order determined from the vehicle ownership and the corresponding SOC of each vehicle (such as the vehicle 114A) of the plurality of vehicles, the electronic device 102 may control charging of each vehicle (such as the vehicle 114A) of the plurality of vehicles, and effectively optimizes the energy usage of available charging sources (such as, the first charging source 104A or the second charging source 104B).

Figure 12:
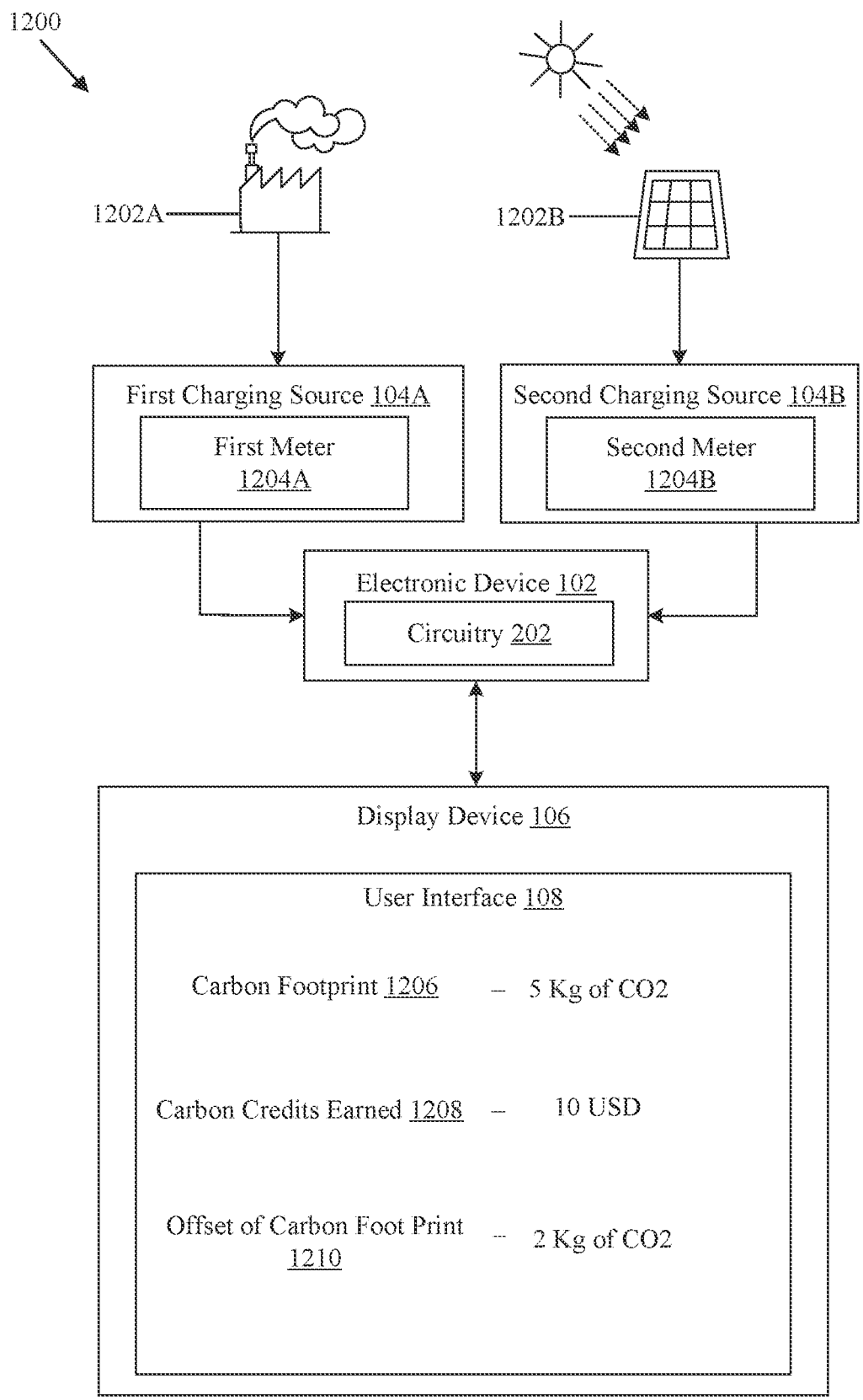
FIG. 12 is a block diagram that illustrates an exemplary scenario for displaying an amount of carbon credits earned and corresponding offset of carbon footprint of vehicles, via an exemplary electronic device shown in the exemplary network environment of FIG. 1, in accordance with an embodiment of the disclosure.

FIG. 12 is a block diagram that illustrates an exemplary scenario for displaying an amount of carbon credits earned and corresponding offset of carbon footprint of vehicles, based on the energy management of charging sources, via an exemplary electronic device shown in the exemplary network environment of FIG. 1, in accordance with an embodiment of the disclosure. FIG. 12 is explained in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown an exemplary block diagram 1200.

In an embodiment, the first charging source 104A may include a first meter 1204A and the second charging source 104B may include a second meter 1204B. The first charging source 104A may be based on a non-renewable energy source 1202A (such as an oil-based energy source, a natural gas-based energy source, a coal energy source, a nuclear energy source, etc.) and the second charging source 104B may be based on a renewable energy source 1202B (such as, a solar energy, a wind energy, a tidal energy, a hydropower, a biomass energy, a biofuel energy, a geothermal energy or a hydrogen-based energy). The first charging source 104A and the second charging source 104B may be used for charging the plurality of vehicles. Details about the first charging source 104A and the second charging source 104B are provided, for example, in FIG. 1. Energy readings from the first meter 1204A may correspond to the carbon footprint in the charging event for charging each vehicle of the plurality of vehicles. The carbon footprint may relate to information associated with the amount of carbon spent based on the usage of the first charging source 104A to charge each vehicle of the plurality of vehicles. Details about the carbon footprint in a charging event are provided, for example, in FIG. 1.

Energy readings from the second meter 1204B may correspond to the carbon credits earned for the usage of the second charging source 104B. For example, the carbon credits may relate to information associated with the carbon-saving amount (as shown in FIG. 1) determined based on the usage of the second charging source 104B. The circuitry 202 may be further configured to compare the amount of carbon spent with the carbon-saving amount to determine offset of the carbon footprint. The comparison may provide a carbon offset (i.e., an effective amount of carbon saved), which may be determined based on a difference between the amount of carbon saved via the second charging source 104B and the amount of carbon spent via the first charging source 104A. Such effective amount of carbon saved may indicate a reduction in carbon emissions in charging the vehicle 114A based on the control of the electronic device 102. In an embodiment, the first charging source 104A may be based on the non-renewable energy source 1202A, and the readings of the first meter 1204A may correspond to the carbon footprint in the charging event. The second charging source 104B may be based on the renewable energy source 1202B, and the readings of the second meter 1204B may correspond to the carbon-saving amount.

In an embodiment, the display device 106 may be associated with the electronic device 102. The electronic device 102 may include the circuitry 202 that may be configured to display on the user interface 108, the readings of the first meter 1204A and the readings of the second meter 1204B as shown, for example, in FIG. 12. For example, the readings of the first meter 1204A may correspond to the carbon footprint 1206 (such as, '5 Kg of CO2') and the readings of the second meter 1204B may correspond to the carbon credits earned 1208 (such as, '$10 USD'). The circuitry 202 may further display the offset of carbon footprint 1210 (such as, '2 Kg of CO2') that may correspond to the amount of carbon footprint saved by using the second charging source 104B.

Figure 13:
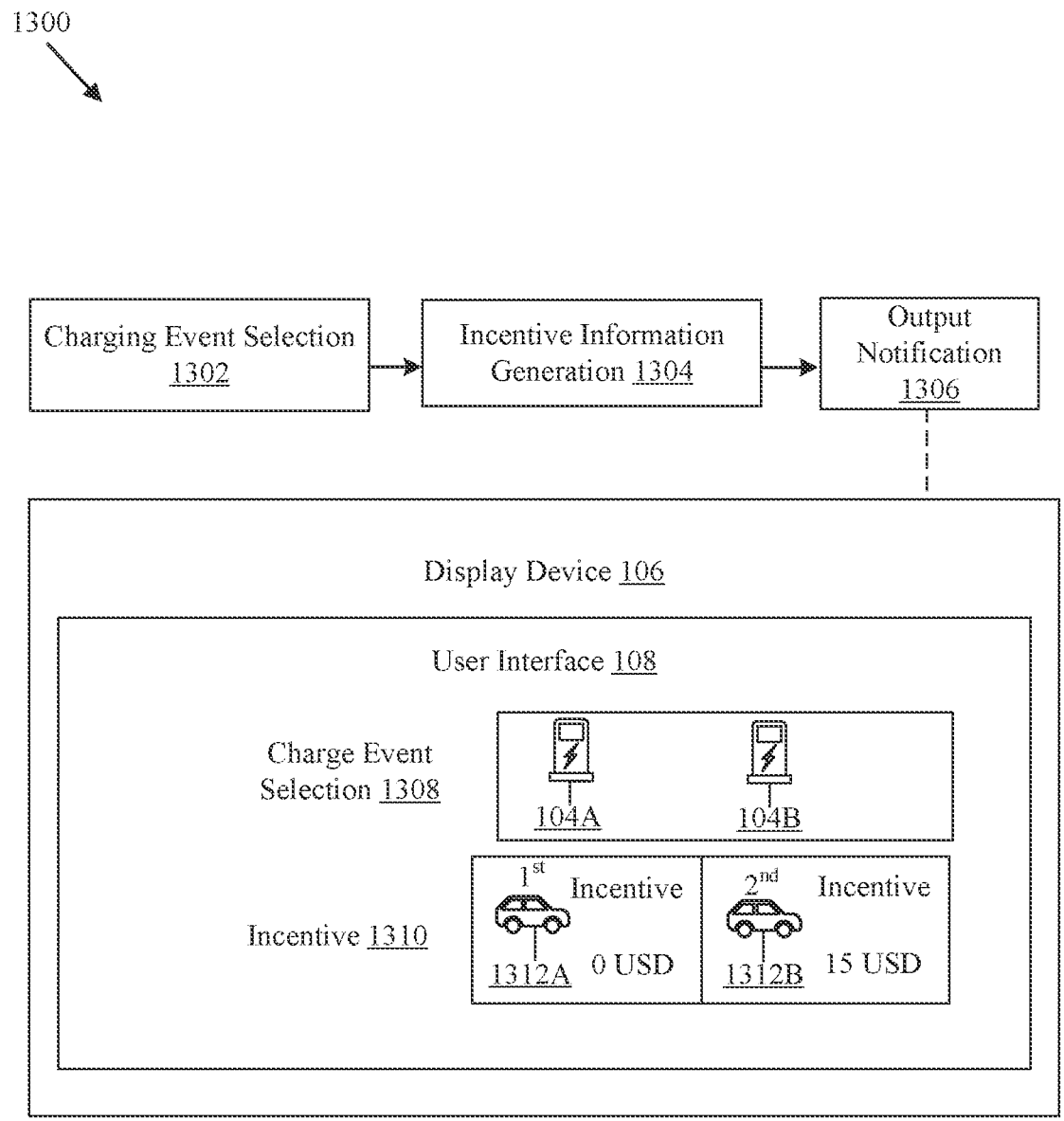
FIG. 13 is a diagram that illustrates an exemplary execution pipeline for generating incentive information based on a charging event of vehicles, in accordance with an embodiment of the disclosure.

FIG. 13 is a diagram that illustrates an exemplary execution pipeline for generating incentive information based on a charging event of vehicles, in accordance with an embodiment of the disclosure. FIG. 13 is explained in conjunction with elements from FIGS. 1, 2, 3, 4, 5, 6, 7, 8, 9, 10, 11, and 12. With reference to FIG. 13, there is shown an exemplary execution pipeline 1300. The execution pipeline may include a set of operations (1302 to 1306) that may be executed by one or more components of FIG. 1, such as, the electronic device 102 or the circuitry 202 in FIG. 2. The set of operations may be performed by the electronic device 102 for energy management of charging sources to optimize energy usage.

At 1302, charging event selection operation may be executed. In an embodiment, the circuitry 202 may be configured to receive, based on the notification, a selection of a charging event of the vehicle in at least one of: the first charging source 104A or the second charging source 104B. For example, based on the notification, the circuitry 202 may be configured to receive the selection of the charging event of one of: the first charging source 104A or the second charging source 104B. Details about the notification, and charging event generation are provided, for example, in FIG. 1 and FIG. 9 at 902. As described in FIGS. 1 and 9, the circuitry 202 may generate the notification and/or the charging events for the user of a particular vehicle, about the cost saving and carbon saving related to the first charging source 104A and the second charging source 104B. The circuitry 202 may further receive, via the I/O device 206, user inputs to select a particular charging source or the charging event to get the vehicle charged at the selected charging source (like one of the first charging source 104A and the second charging source 104B).

At 1304, incentive information generation operation may be executed. In an embodiment, the circuitry 202 may be configured to generate incentive information based on the received selection. The incentive information may indicate a monetary reward for the vehicle (for the associated user) that selects the second charging source 104B than the first charging source 104A. For example, in some cases, the vehicle A may be associated the first charging source 104A (non-renewable source) and the second charging source 104B (renewable source). If the vehicle A (or the associated user) selects the second charging source 104B for charging based on the received notification from the electronic device 102, then the circuitry 202 may transmit a monetary incentive (for example, 'in $') to an account of the user of the vehicle A. Such monetary incentive may motivate users of the vehicles to select the second charging source 104B in near future as well and control the carbon footprint that may be generated from the first charging source 104A.

At 1308, output notification operation may be executed. In an embodiment, the circuitry 202 may be configured to output the notification based on the generated incentive information. The generated incentive information may be displayed on the user interface 108 of the display device 106. For example, as displayed on the user interface 108, the vehicles in queue may be associated with a corresponding charging source (such as, the first charging source 104A and the second charging source 104B) for a charge event selection 1308. For example, information about the charging sources and information about cost saving and carbon saving may be displayed for the user on the user interface 108 as shown, for example, in FIGS. 13 and 1. Based on the selection of the charging sources, the users of the vehicles may be provided with an incentive 1310. In case a first user of a first vehicle selects the first charging source 104A displayed in the charge event selection 1308, the circuitry 202 may generate a first incentive 1312A (such as '0 USD') for the first user based on the selection of the first charging source 104A (non-renewable source). In case a second user of a first vehicle selects the second charging source 104B displayed in the charge event selection 1308, the circuitry 202 may generate a second incentive 1312B (such as '15 USD') for the second user based on the selection of the second charging source 104B (renewable source). In an embodiment, the second incentive has a higher monetary value compared to the first incentive. Such higher monetary value may motivate users to select the second charging source 104B than the first charging source 104A and minimize carbon emissions that may be generated from the first charging source 104A. Therefore, the disclosed electronic device 102 may monitor the charging cost and carbon footprints of multiple charging sources, notify the user (associated with the vehicle and with the electronic device 102) about the cost and carbon savings of the charging sources, receive selection from the user about the charging sources, and finally motivate the user to use the renewable charging sources based on generated incentives. Further, based on the determined charging event and corresponding incentive information, for each vehicle (such as the vehicle 114A) of the plurality of vehicles, the electronic device 102 may transmit incentive based on the selected route for each vehicle (such as the vehicle 114A) of the plurality of vehicles to the corresponding charging source (such as the first charging source 104A or the second charging source 104B). In case the vehicle is routed to the second charging source 104B and receives the inventive based on the routing of the vehicle, there may be minimal carbon emissions due to the usage of renewable energy source in the second charging source 104B. Such routing may effectively optimize the energy usage of available charging sources (such as, the second charging source 104B) with minimal carbon emissions.

Figure 14:
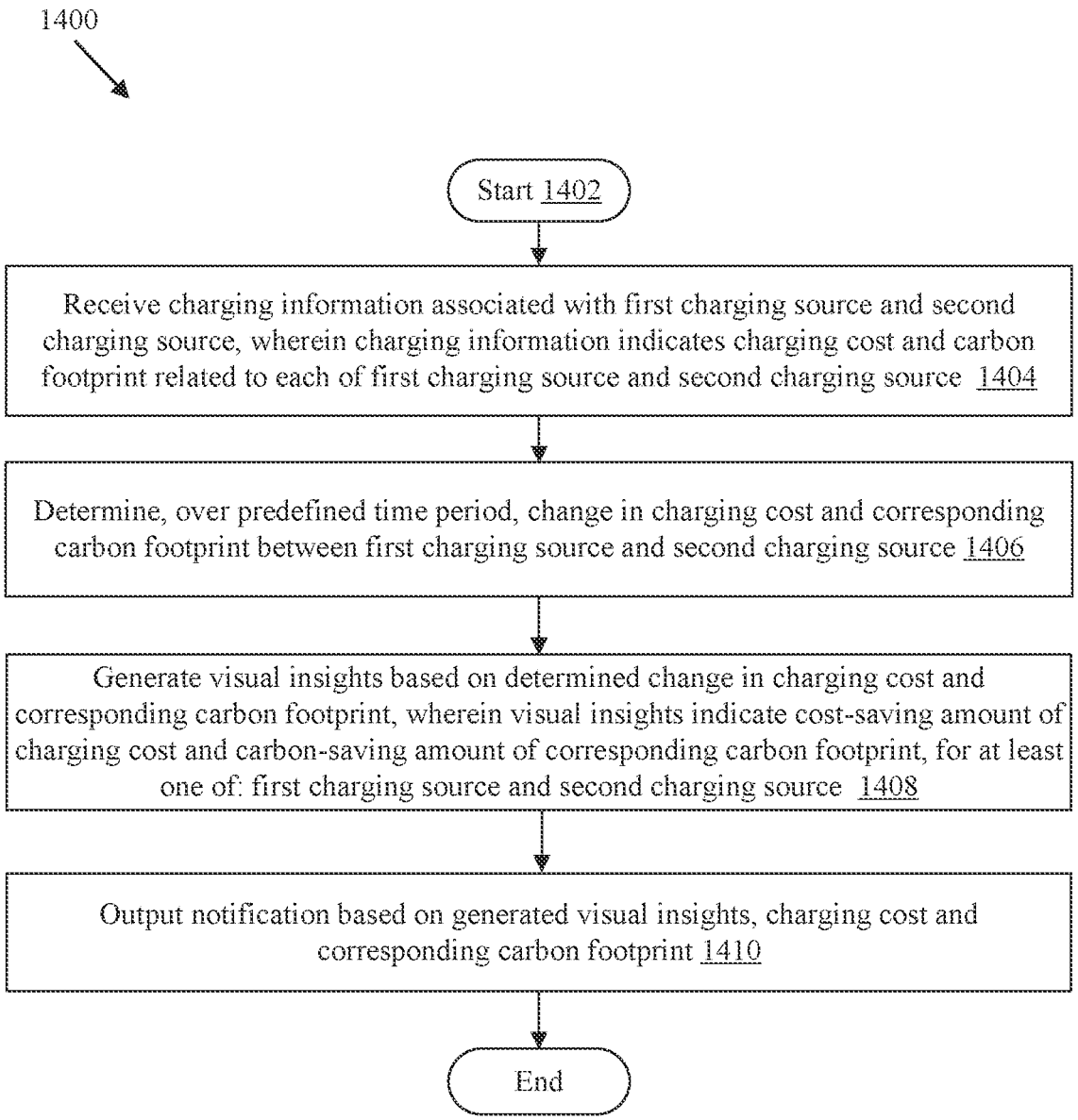
FIG. 14 is a flowchart that illustrates exemplary operations for energy management of charging sources, in accordance with an embodiment of the disclosure.

FIG. 14 is a flowchart that illustrates exemplary operations for energy management of charging sources, in accordance with an embodiment of the disclosure. The flowchart 1400 is described in conjunction with FIGS. 1, 2, 3, 4, 5, 6, 7, 8, 9, 10, 11, 12, and 13. The operations from 1402 to 1410 may be implemented, for example, by the electronic device 102 of FIG. 1 or the circuitry 202 of FIG. 2. The operations of the flowchart 1400 may start at 1402 and proceed to 1404.

At 1404, the information associated with the first charging source 104A and the second charging source 104B may be received. In one or more embodiments, the circuitry 202 may be configured to receive charging information associated with the first charging source 104A and the second charging source 104B. The charging information may indicate the charging cost and the carbon footprint related to each of the first charging source 104A and the second charging source 104B. Details about the reception of the information associated with the first charging source 104A and the second charging source 104B may be described further, for example, in FIG. 1.

At 1406, the change in the charging cost and the corresponding carbon footprint may be determined. In one or more embodiments, the circuitry 202 may be configured to determine, over the predefined time period, the change in the charging cost and the corresponding carbon footprint between the first charging source 104A and the second charging source 104B. Details about the change in the charging cost and the corresponding carbon footprint may be described further, for example, in FIG. 1.

At 1408, the visual insights based on the determined change in the charging cost and the corresponding carbon footprint may be generated. In one or more embodiment, the circuitry 202 may be configured to generate the visual insights based on the determined change in the charging cost and the corresponding carbon footprint. The visual insights may indicate the cost-saving amount of the charging cost and the carbon-saving amount of the corresponding carbon footprint, for at least one of: the first charging source 104A and the second charging source 104B. Details about the generation of the visual insights may be described further, for example, in FIG. 1.

At 1408, the notification based on the generated visual insights, the charging cost and the corresponding carbon footprint may be output. The output notification of the generated visual insights may be described further, for example, in FIG. 1.

The flow chart shown in FIG. 14 is illustrated as discrete operations, such as from 1402 to 1408, which relates to energy management via the electronic device 102. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the electronic device 102) for energy management during the charging event of the vehicles. The set of instructions may be executable by the machine and/or the computer (for example the electronic device 102) to perform specific operations. The operations may include reception of charging information associated with the first charging source 104A and the second charging source 104B. The operation may further include determination of the change in the charging cost and the corresponding carbon footprint between the first charging source 104A and the second charging source 104B. The operation may further include generation of visual insights based on the determined change in the charging cost and the corresponding carbon footprint. The operation may further include output of the notification based on the generated visual insights, the charging cost, and the corresponding carbon footprint.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive charging information associated with a first charging source and a second charging source, wherein the charging information indicates a charging cost and a carbon footprint related to each of the first charging source and the second charging source;
   determine, over a predefined time period, a change in the charging cost and the corresponding carbon footprint between the first charging source and the second charging source;
   generate visual insights based on the determined change in the charging cost and the corresponding carbon footprint, wherein the visual insights indicate a cost-saving amount of the charging cost and a carbon-saving amount of the corresponding carbon footprint, for at least one of: the first charging source and the second charging source; and
   output a notification based on the generated visual insights, the charging cost, and the corresponding carbon footprint.

2. The electronic device according to claim 1, wherein the circuitry is further configured to:
   receive a state-of-charge from a plurality of vehicles associated with at least one of: the first charging source and the second charging source;
   determine a priority order for each vehicle of the plurality of vehicles to charge from at least one of: the first charging source and the second charging source, based on the received state-of-charge from the plurality of vehicles;
   generate scheduling information based on the priority order, wherein the scheduling information indicates an order of charging of each vehicle of the plurality of vehicles; and
   output the notification based on the scheduling information.

3. The electronic device according to claim 1, wherein the circuitry is further configured to:
   receive availability information of a plurality of vehicles associated with at least one of: the first charging source and the second charging source, wherein the availability information corresponds to a period of availability of each vehicle of the plurality of vehicles at a location related to at least one of: the first charging source and the second charging source;
   determine a priority order for each vehicle of the plurality of vehicles to charge from at least one of: the first charging source and the second charging source, based on the received availability information;
   generate scheduling information based on the priority order, wherein the scheduling information indicates an order of charging of each vehicle of the plurality of vehicles; and
   output the notification based on the scheduling information.

4. The electronic device according to claim 3, wherein the circuitry is further configured to:
   determine an overlap in the period of availability of at least two vehicles of the plurality of vehicles;
   generate incentive information based on the determined overlap, wherein the incentive information indicates a monetary reward for a vehicle of the plurality of vehicles that performs charging later than other vehicles in the plurality of vehicles; and
   output the notification based on the generated the scheduling information and the incentive information.

5. The electronic device according to claim 1, wherein the circuitry is further configured to:
   receive traveling information of a plurality of vehicles associated with at least one of: the first charging source and the second charging source, wherein the traveling information corresponds to a forecast on a distance of travel of each vehicle of the plurality of vehicles from a source location to a destination location;
   determine a priority order for each vehicle of the plurality of vehicles to charge from at least one of: the first charging source and the second charging source, based on the received traveling information;
   generate scheduling information based on the priority order for the plurality of vehicles, wherein the scheduling information indicates an order of charging of each vehicle of the plurality of vehicles; and
   output the notification based on the generated scheduling information.

6. The electronic device according to claim 5, wherein the circuitry is further configured to:
   receive a route map of travel of each vehicle of the plurality of vehicles from the source location to the destination location;
   determine charging sources located in the route map, wherein the charging sources are determined based on a state-of-charge (SOC) of each vehicle of the plurality of vehicles and the distance of travel of each vehicle of the plurality of vehicles from the source location to the destination location;
   generate routing information based on the charging sources, wherein the routing information indicates the charging sources located in the route map; and
   output the notification based on the generated routing information.

7. The electronic device according to claim 1, wherein the circuitry is further configured to:
   receive demand information of at least one of: the first charging source and the second charging source, wherein the demand information indicates a required period of availability of at least one of: the first charging source or the second charging source, to charge at least one vehicle of a plurality of vehicles;
   determine a priority order for each vehicle of the plurality of vehicles to charge from at least one of: the first charging source and the second charging source, based on the received demand information;
   generate scheduling information based on the priority order for the plurality of vehicles, wherein the scheduling information indicates an order of charging of each vehicle of the plurality of vehicles; and
   output the notification based on the generated the scheduling information.

8. The electronic device according to claim 1, wherein the circuitry is further configured to:
   generate a charging event based on the notification, wherein the charging event corresponds to a period of charging for each vehicle of a plurality of vehicles associated with at least one of: the first charging source and the second charging source; and
   store, in a memory associated with the electronic device, information related to the generated charging event for each vehicle of the plurality of vehicles.

9. The electronic device according to claim 1, wherein the circuitry is further configured to:
- set access control information for each vehicle of a plurality of vehicles associated with at least one of: the first charging source and the second charging source, wherein the access control information corresponds to a level of control of charging a vehicle from the plurality vehicles from at least one of: the first charging source and the second charging source; and
- transmit the access control information to at least one of: the first charging source and the second charging source, to allow charging of the vehicle from at least one of: the first charging source and the second charging source.

10. The electronic device according to claim 1, wherein the notification corresponds to at least one of: a visual notification, an audible notification, an audio-visual notification, or a vibratory notification.

11. The electronic device according to claim 1, wherein the circuitry is further configured to:
- receive a vehicle identification number associated with a vehicle of a plurality of vehicles;
- compare the received vehicle identification number with each of a pre-stored vehicle identification numbers, to determine an ownership of the vehicle;
- determine a state-of-charge for the vehicle based on the determined ownership;
- generate scheduling information based on the state-of-charge and the determined ownership, wherein the scheduling information indicates an order of charging of the vehicle in at least one of: the first charging source or the second charging source; and
- output the notification based on the generated the scheduling information.

12. The electronic device according to claim 1, wherein the first charging source comprises a first meter and the second charging source comprises a second meter, wherein
- energy readings from the first meter corresponds to the carbon footprint in a charging event, wherein the carbon footprint relates to information associated with an amount of carbon spent based on a usage of the first charging source to charge a vehicle; and
- energy readings from the second meter corresponds to carbon credits earned for a usage of the second charging source, wherein the carbon credits relate to information associated with the carbon-saving amount determined based on a usage of the second charging source,
- wherein the circuitry is further configured to compare the amount of carbon spent with the carbon-saving amount to determine offset of the carbon footprint.

13. The electronic device according to claim 1, wherein circuitry is further configured to:
- receive, based on the notification, a selection of a charging event of a vehicle in at least one of: the first charging source or the second charging source;
- generate incentive information based on the received selection, wherein the incentive information indicates a monetary reward for the vehicle that selects the second charging source than the first charging source; and
- output the notification based on the generated the incentive information.

14. The electronic device according to claim 1, wherein first charging source is based on a non-renewable energy source and the second charging source is based on a renewable energy source.

15. The electronic device according to claim 1, wherein the notification is displayed on a display device associated with the electronic device.

16. A method, comprising:
in an electronic device:
- receiving charging information associated with a first charging source and a second charging source, wherein the charging information indicates a charging cost and a carbon footprint related to each of the first charging source and the second charging source;
- determining, over a predefined time period, a change in the charging cost and the corresponding carbon footprint between the first charging source and the second charging source;
- generating visual insights based on the determined change in the charging cost and the corresponding carbon footprint, wherein the visual insights indicate a cost-saving amount of the charging cost and a carbon-saving amount of the corresponding carbon footprint, for at least one of: the first charging source and the second charging source; and
- outputting a notification based on the generated visual insights, the charging cost and the corresponding carbon footprint.

17. The method according to claim 16, further comprising:
- receiving a state-of-charge from a plurality of vehicles associated with at least one of: the first charging source and the second charging source;
- determining a priority order for each vehicle of the plurality of vehicles to charge from at least one of: the first charging source and the second charging source, based on the received state-of-charge from the plurality of vehicles;
- generating scheduling information based on the priority order, wherein the scheduling information indicates an order of charging of each vehicle of the plurality of vehicles; and
- outputting the notification based on the generated visual insights and the scheduling information.

18. The method according to claim 16, wherein first charging source is based on a non-renewable energy source and the second charging source is based on a renewable energy source.

19. The method according to claim 16, further comprising controlling a display of the notification on a display device associated with an electronic device.

20. A non-transitory computer-readable medium having stored thereon, computer-executable instructions which, when executed by an electronic device, cause the electronic device to execute operations, the operations comprising:
- receiving charging information associated with a first charging source and a second charging source, wherein the charging information indicates a charging cost and a corresponding carbon footprint related to each of the first charging source and the second charging source;
- determining, over a predefined time period, a change in the charging cost and the corresponding carbon footprint between the first charging source and the second charging source;
- generating visual insights based on the determined change in the charging cost and the corresponding carbon footprint, wherein the visual insights indicate a cost-saving amount of the charging cost and a carbon-saving amount of the corresponding carbon footprint, for at least one of: the first charging source and the second charging source; and outputting a notification based on the generated visual insights, the charging cost and the corresponding carbon footprint.

\* \* \* \* \*